(12) United States Patent  (10) Patent No.: US 8,515,865 B1
Marathe et al.  (45) Date of Patent: Aug. 20, 2013

(54) METHODS, SYSTEMS, AND PRODUCTS FOR CHARGING BATTERIES

(75) Inventors: Nikhil S. Marathe, Roselle, IL (US); Christopher F. Baldwin, Crystal Lake, IL (US); Bruce Barnes, Pingree Grove, IL (US); Patrick John Kenny, Barrington, IL (US); Shadi Khoshaba, Skokie, IL (US); Charles Stahulak, Chicago, IL (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 13/481,785

(22) Filed: May 26, 2012

(51) Int. Cl.
*G06Q 40/00* (2006.01)

(52) U.S. Cl.
USPC .............................................. 705/39; 705/40

(58) Field of Classification Search
USPC ....................................................... 705/35–40
See application file for complete search history.

(56) References Cited

U.S. PATENT DOCUMENTS

| | | | |
|---|---|---|---|
| 5,072,380 A | 12/1991 | Randelman et al. | |
| 5,557,268 A | 9/1996 | Hughes et al. | |
| 5,956,259 A | 9/1999 | Hartsell, Jr. et al. | |
| 6,381,514 B1 | 4/2002 | Hartsell, Jr. | |
| 6,912,503 B1 | 6/2005 | Quarendon et al. | |
| 7,082,406 B1 | 7/2006 | Dickson | |
| 7,640,185 B1 | 12/2009 | Giordano et al. | |
| 2010/0017249 A1* | 1/2010 | Fincham et al. | 705/8 |
| 2010/0292877 A1 | 11/2010 | Lee | |
| 2011/0106329 A1 | 5/2011 | Donnelly et al. | |
| 2012/0011294 A1 | 1/2012 | Shankar et al. | |

* cited by examiner

*Primary Examiner* — Thu Thao Havan
(74) *Attorney, Agent, or Firm* — Scott P. Zimmerman, PLLC

(57) ABSTRACT

Methods, systems, and products charge a battery in a vehicle. A charging station selects charging parameters based on a vehicle identification number associated with the vehicle.

20 Claims, 34 Drawing Sheets

FIG. 24

VIN: 1GCAB67K26S8$\underbrace{12345}_{202}$

180

$$\text{Multiplier} = \frac{\overbrace{12345}^{202}}{\text{Reference Numeral}} \leftarrow 204$$

200

METHODS, SYSTEMS, AND PRODUCTS FOR CHARGING BATTERIES

COPYRIGHT NOTIFICATION

A portion of the disclosure of this patent document and its attachments contain material which is subject to copyright protection. The copyright owner has no objection to the facsimile reproduction by anyone of the patent document or the patent disclosure, as it appears in the Patent and Trademark Office patent files or records, but otherwise reserves all copyrights whatsoever.

BACKGROUND

Electric vehicles (or "EVs") have been proposed since the earliest days of the automotive industry. With today's stringent pollution laws and mileage requirements, electric vehicles are again gaining attention. All-electric vehicles and hybrid-electric vehicles are coming to market, and public charging stations are being proposed and installed throughout the country. These charging stations allow a vehicle's battery to be charged while the driver shops or works.

BRIEF DESCRIPTION OF THE SEVERAL VIEWS OF THE DRAWINGS

The features, aspects, and advantages of the exemplary embodiments are better understood when the following Detailed Description is read with reference to the accompanying drawings, wherein:

FIGS. 21-25 are diagrams illustrating selection of parameter(s), according to exemplary embodiments;

DETAILED DESCRIPTION

The exemplary embodiments will now be described more fully hereinafter with reference to the accompanying drawings. The exemplary embodiments may, however, be embodied in many different forms and should not be construed as limited to the embodiments set forth herein. These embodiments are provided so that this disclosure will be thorough and complete and will fully convey the exemplary embodiments to those of ordinary skill in the art. Moreover, all statements herein reciting embodiments, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating the exemplary embodiments. The functions of the various elements shown in the figures may be provided through the use of dedicated hardware as well as hardware capable of executing associated software. Those of ordinary skill in the art further understand that the exemplary hardware, software, processes, methods, and/or operating systems described herein are for illustrative purposes and, thus, are not intended to be limited to any particular named manufacturer.

As used herein, the singular forms "a," "an," and "the" are intended to include the plural forms as well, unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

It will also be understood that, although the terms first, second, etc. may be used herein to describe various elements, these elements should not be limited by these terms. These terms are only used to distinguish one element from another. For example, a first device could be termed a second device, and, similarly, a second device could be termed a first device without departing from the teachings of the disclosure.

Figure 1:
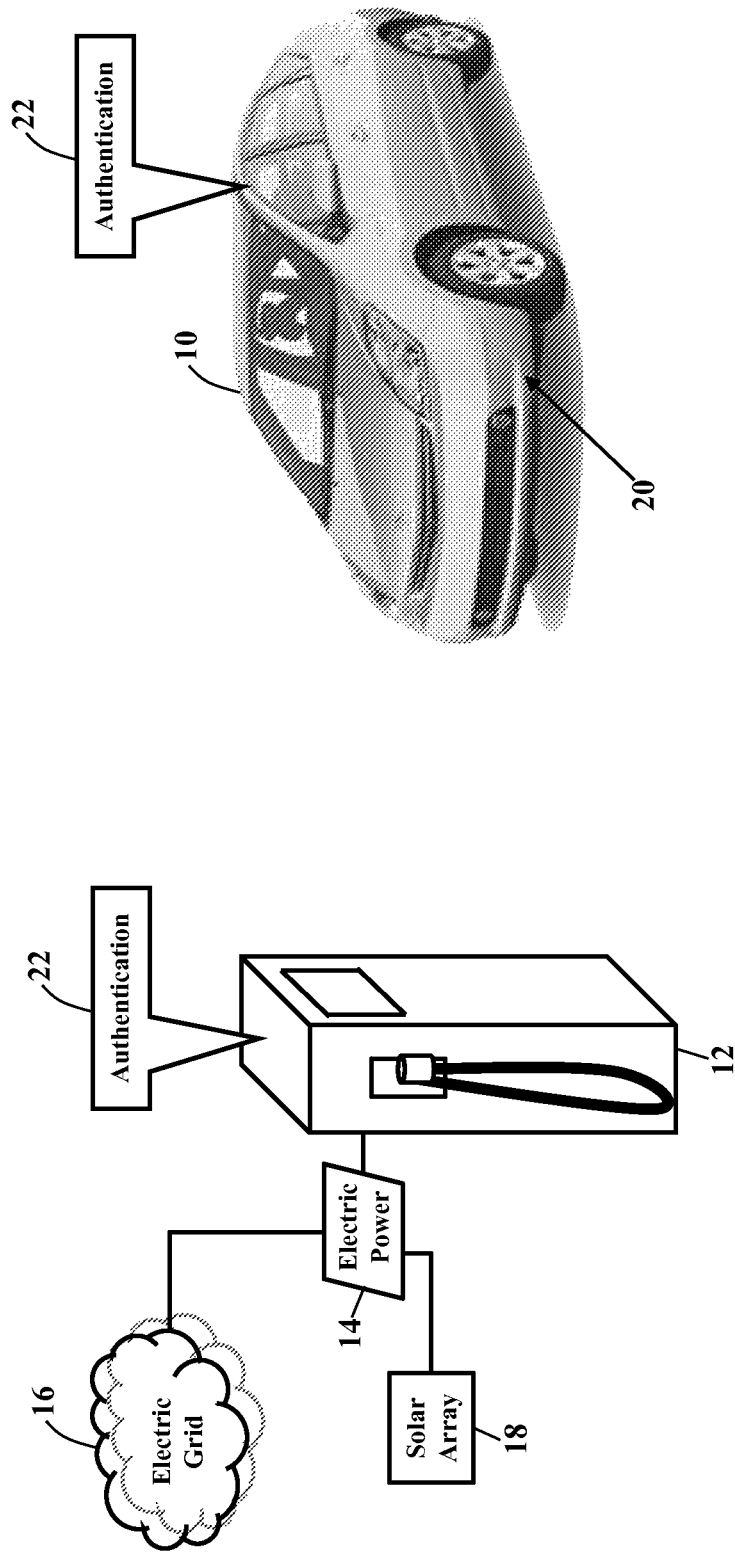
FIGS. 1-4 are simplified schematics illustrating an operating environment in which exemplary embodiments may be implemented.

FIGS. 1-4 are simplified schematics illustrating an environment in which exemplary embodiments may be implemented. FIG. 1 illustrates a vehicle 10 and a charging station 12. The charging station 12 receives electrical power 14 (e.g., current and voltage) from the electric grid 16, a solar array 18, or any other source. The charging station 12 wiredly and/or wirelessly transmits some or all of the electrical power 14 to the vehicle 10. The electrical power 14 is stored in one or more batteries 20 installed within the vehicle 10. Because the vehicle 10, the charging station 12, and the batteries 20 are generally known, this disclosure will not dwell on the known aspects.

Charging, though, may require an authentication 22. Before the batteries 20 may be initially or partially charged, some authentication procedure may be required. The driver, for example, may need to successfully authenticate, and/or the vehicle 10 itself may authenticate. Regardless, if the authentication 22 is successful, the batteries 20 may be fully charged. If, however, the authentication 22 fails, then charging may be terminated.

Figure 2:
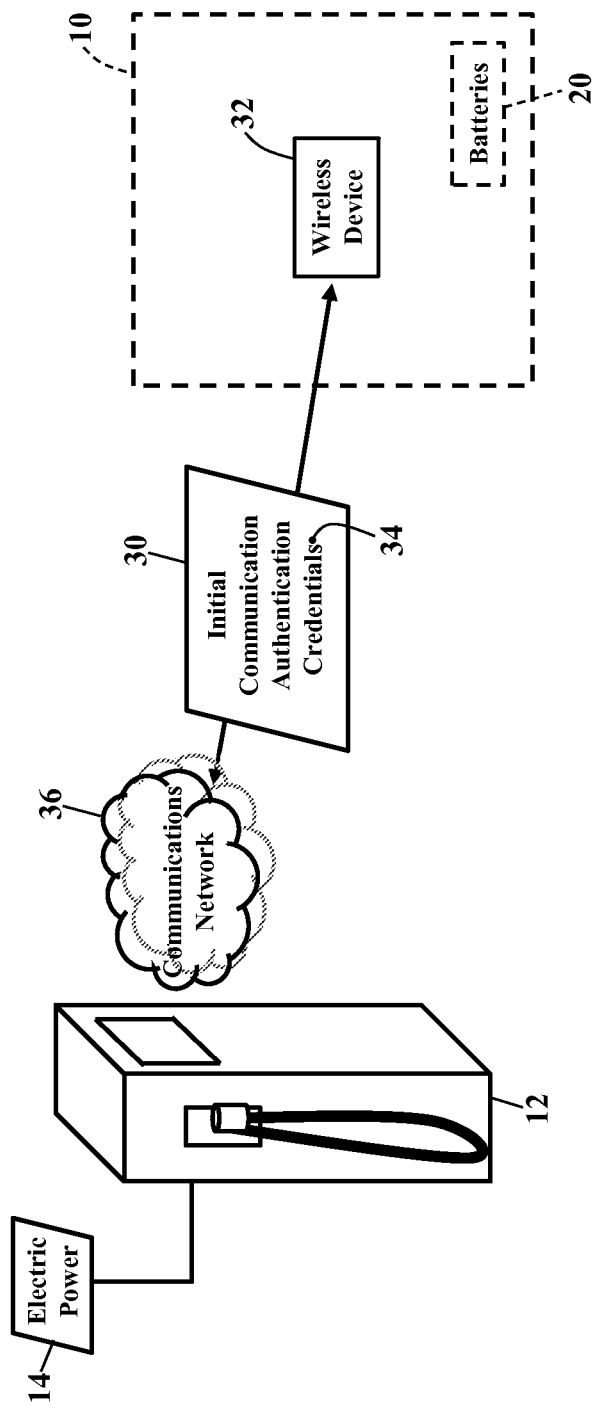

FIG. 2 illustrates a first authentication. Here a driver or passenger of the vehicle (illustrated as reference numeral 10) may perform at least part of an authentication procedure for charging the batteries 20 in the vehicle 10. FIG. 2, for example, illustrates an initial communication 30 using a mobile, wireless device 32. The wireless device 32, for example, may be the driver's or occupant's smart phone or computer. The wireless device 32 establishes the initial communication 30 and sends authentication credentials 34. The initial communication 30, for example, may be a communication between the wireless device 32 and the charging station 12 via a communications network 36 (such as cellular, WI-FI® or BLUETOOTH®). The initial communication 30 may thus be any electronic message, text message, or call. When the wireless device 32 establishes the initial communication 30, the wireless device 32 sends the authentication credentials 34. If the authentication credentials 34 are verified, then the charging station 12 may be authorized to charge the batteries 20 in the vehicle 10. If, however, the authentication credentials 34 fail, then charging may be terminated.

Figure 3:
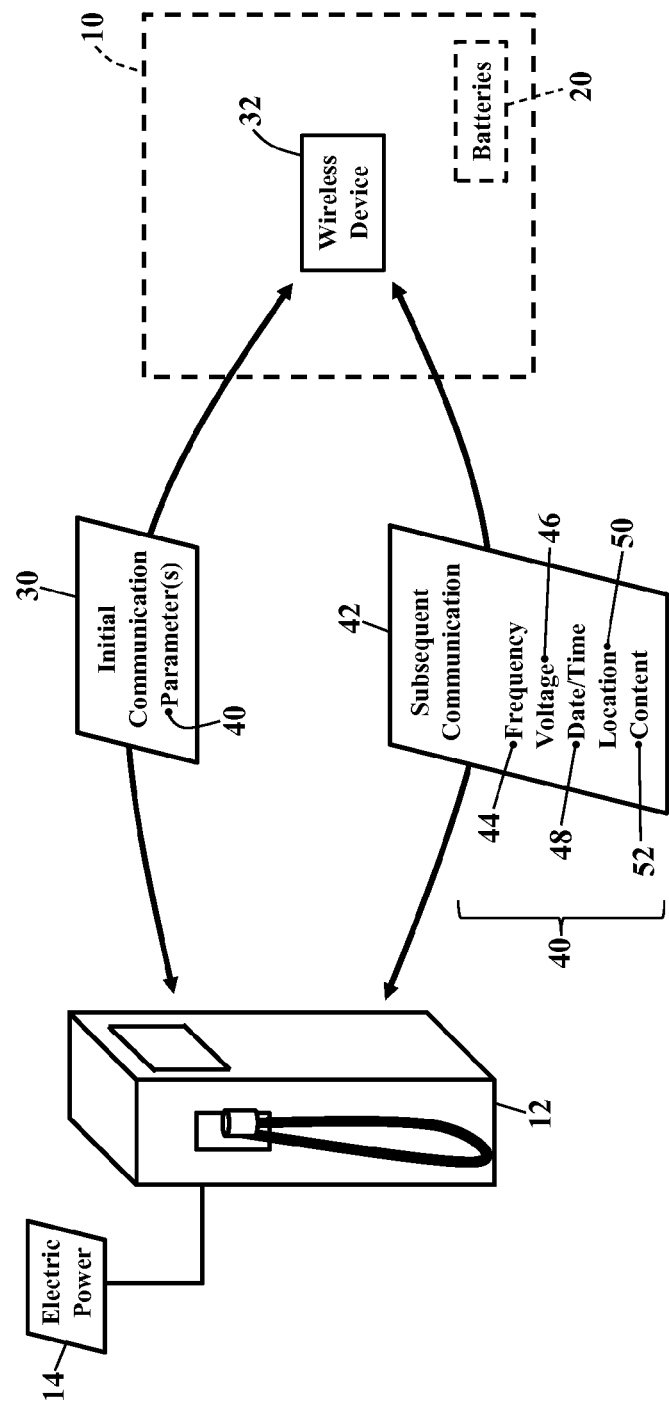

FIG. 3 illustrates a second authentication to further ensure security of the charging process. When the initial communication 30 is established, one or more parameters 40 of a subsequent communication 42 may be selected. That is, the initial communication 30 may only be a preliminary "handshake" that establishes the parameters 40 of the subsequent communication 42. Once the parameters 40 are agreed upon, the initial communication 30 may then be terminated. The subsequent communication 42 is established. If the subsequent communication 42 exhibits the one or more parameters 40, then charging of the batteries 20 may be permitted. If, however, the subsequent communication 42 has a wrong parameter, then charging may be terminated.

Exemplary embodiments may thus include one or more levels of authentication. Some drivers or vehicle owners may be satisfied with a single authentication procedure, such as the authentication credentials (illustrated as reference numeral 34 in FIG. 2). Some people, for example, may be satisfied with a username, password, or other the traditional authentication. Other users, though, may desire a more dynamic and variable authentication procedure (such as the second level of authentication illustrated in FIG. 3). Because the initial communication 30 establishes the parameters 40 of the subsequent communication 42, the subsequent communication 42 adds a second (or more) level of authentication. The initial communication 30, for example, may specify or agree to a frequency 44 of the subsequent communication 42. Other parameters 40, though, may additionally or alternatively include a voltage 46 of the subsequent communication 42, a date and time 48 of the subsequent communication 42, and even a location 50 of the subsequent communication 42. The parameters 40 may also include a content requirement 52, such as a data requirement, picture, algorithm, or further pass code. Indeed, the parameters 40 of the subsequent communication 42 may include any data, information, value, or component that can be specified in or by the initial communication 30. If the subsequent communication 42 exhibits the one or more parameters 40, then authorization may be granted for charging of the batteries 20. If, however, the subsequent communication 42 has one or more wrong parameters, then authentication may be denied.

Figure 4:
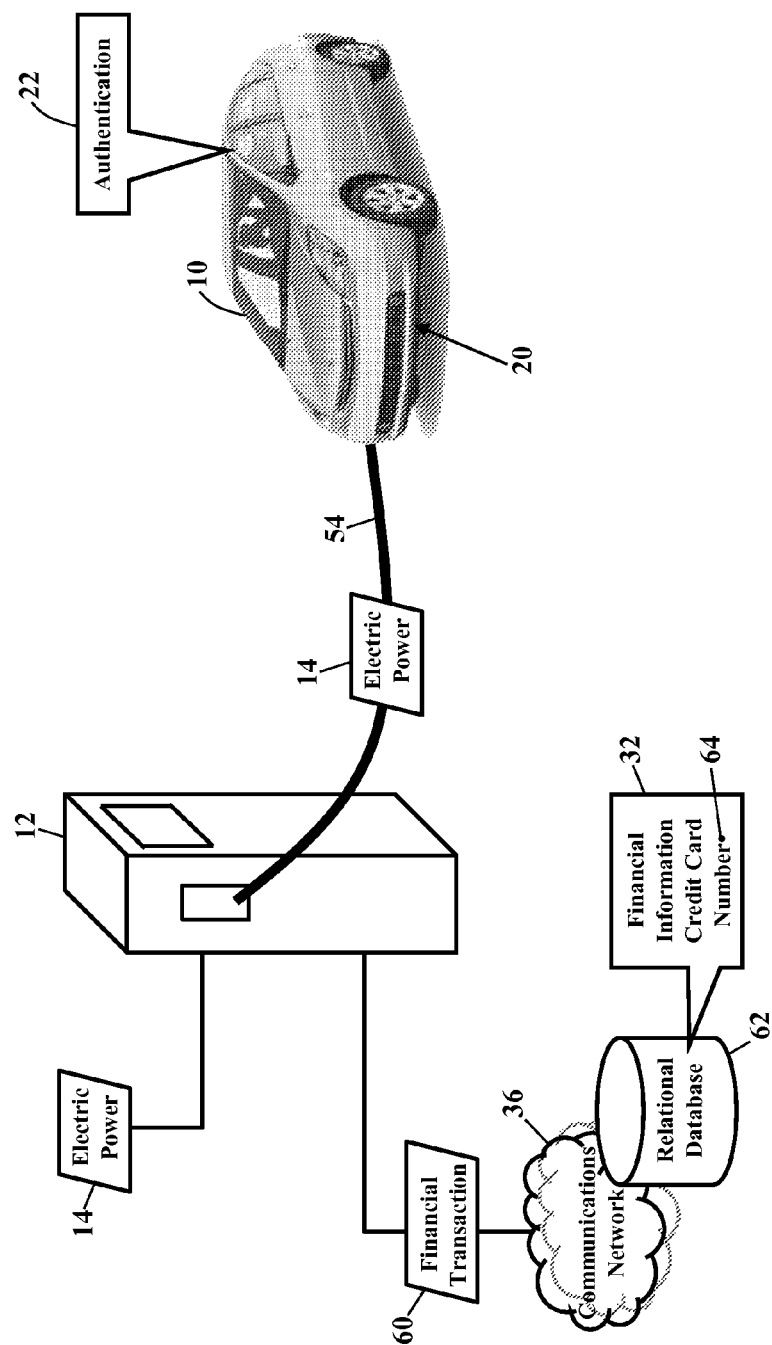

FIG. 4 illustrates payment for charging the batteries 20. When the authentication 22 is successful, the charging station 12 supplies the electrical power 14 to the vehicle's batteries 20. FIG. 4 illustrates the electrical power 14 being transferred over a physical charging cable 54, yet the electrical power 14 may be wirelessly and/or inductively coupled. As the batteries 20 charge, the charging station 12 may meter the electrical power 14 consumed by the vehicle 10. That is, the charging station 12 may measure or log the electrical current and/or voltage consumed (perhaps in kilowatt minutes or hours) to charge the batteries 20. The charging station 12 may thus perform or process a financial transaction 60 for charging the batteries 20 installed within the vehicle 10. The charging station 12, for example, may query a relational database 62 (via the communications network 36). The relational database 62 stores any billing information (such as a credit card number 64) that is processed for payment. Exemplary embodiments thus include a secure and simple automatic payment mechanism for charging the batteries 20. The occupants may thus quickly exit the vehicle 10 and proceed with other tasks without arranging payment.

Figure 5:
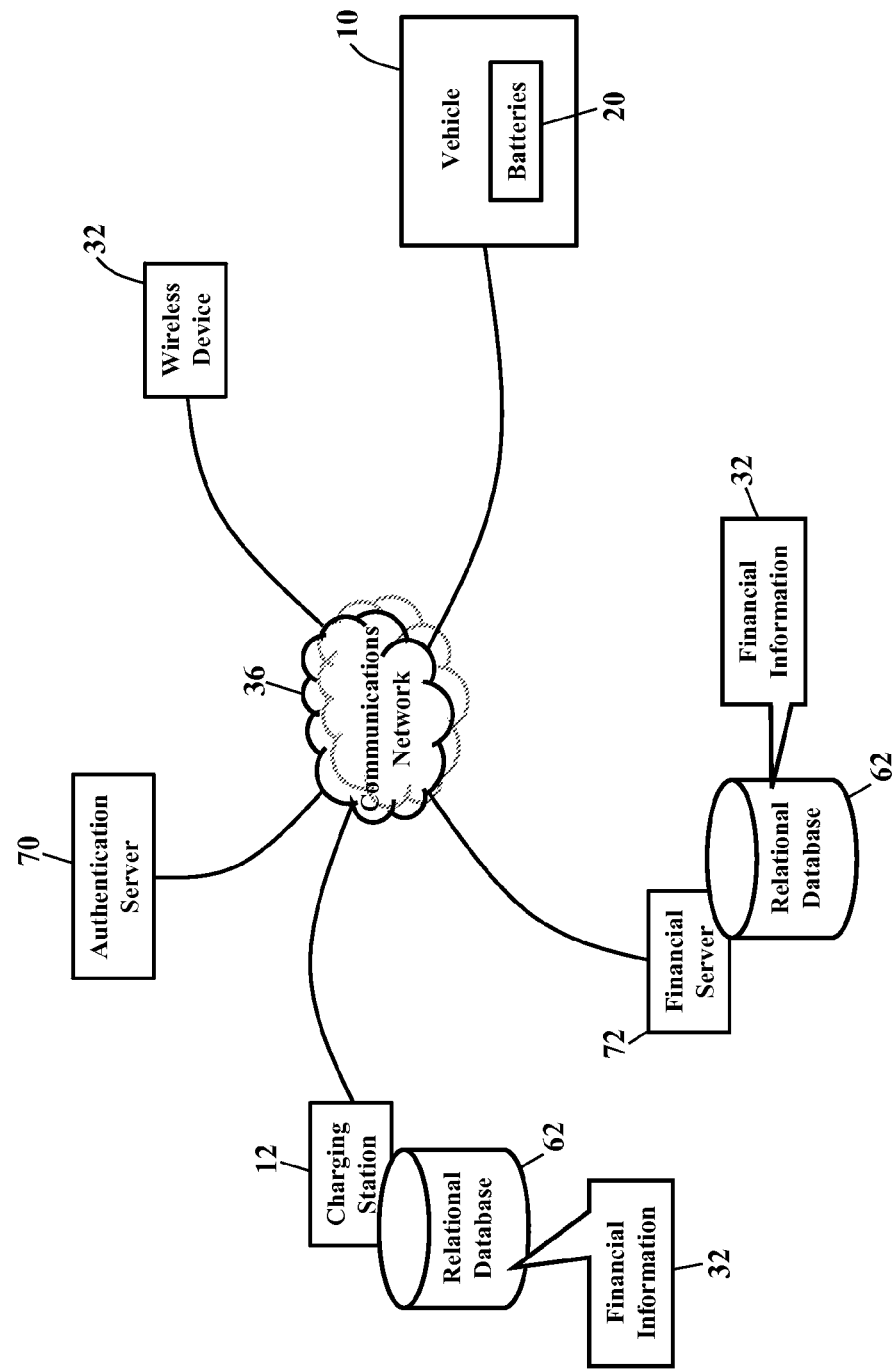
FIG. 5 is a block diagram further illustrating the operating environment, according to exemplary embodiments.

FIG. 5 is a block diagram further illustrating the operating environment, according to exemplary embodiments. Here the vehicle 10 may communicate with the charging station 12 via the communications network 36. The communications network 36, though, may also enable communications with an authentication server 70 and/or with a financial server 72. That is, any of the vehicle 10, the charging station 12, the authentication server 70, and/or the financial server 72 may query and communicate with each other to authenticate charging of the batteries 20 in the vehicle 10.

Exemplary embodiments may be applied regardless of networking environment. The communications network 36 may utilize any portion of the electromagnetic spectrum and any signaling standard (such as the I.E.E.E. 802 family of standards, GSM/CDMA/TDMA or any cellular standard, and/or the ISM band). The communications network 36, for example, may utilize BLUETOOTH® or WI-FI® to establish or convey communications. The communications network 90 may also utilize a radio-frequency domain and/or an Internet Protocol (IP) domain. The communications network 36, however, may also include a distributed computing network, such as the Internet (sometimes alternatively known as the "World Wide Web"), an intranet, a local-area network (LAN), and/or a wide-area network (WAN). The communications network 36 may also include coaxial cables, copper wires, fiber optic lines, and/or hybrid-coaxial lines. The communications network 36 may even include powerline portions, in which signals are communicated via electrical wiring. The concepts described herein may be applied to any wireless/wireline communications network, regardless of physical componentry, physical configuration, or communications standard(s).

Figure 6:
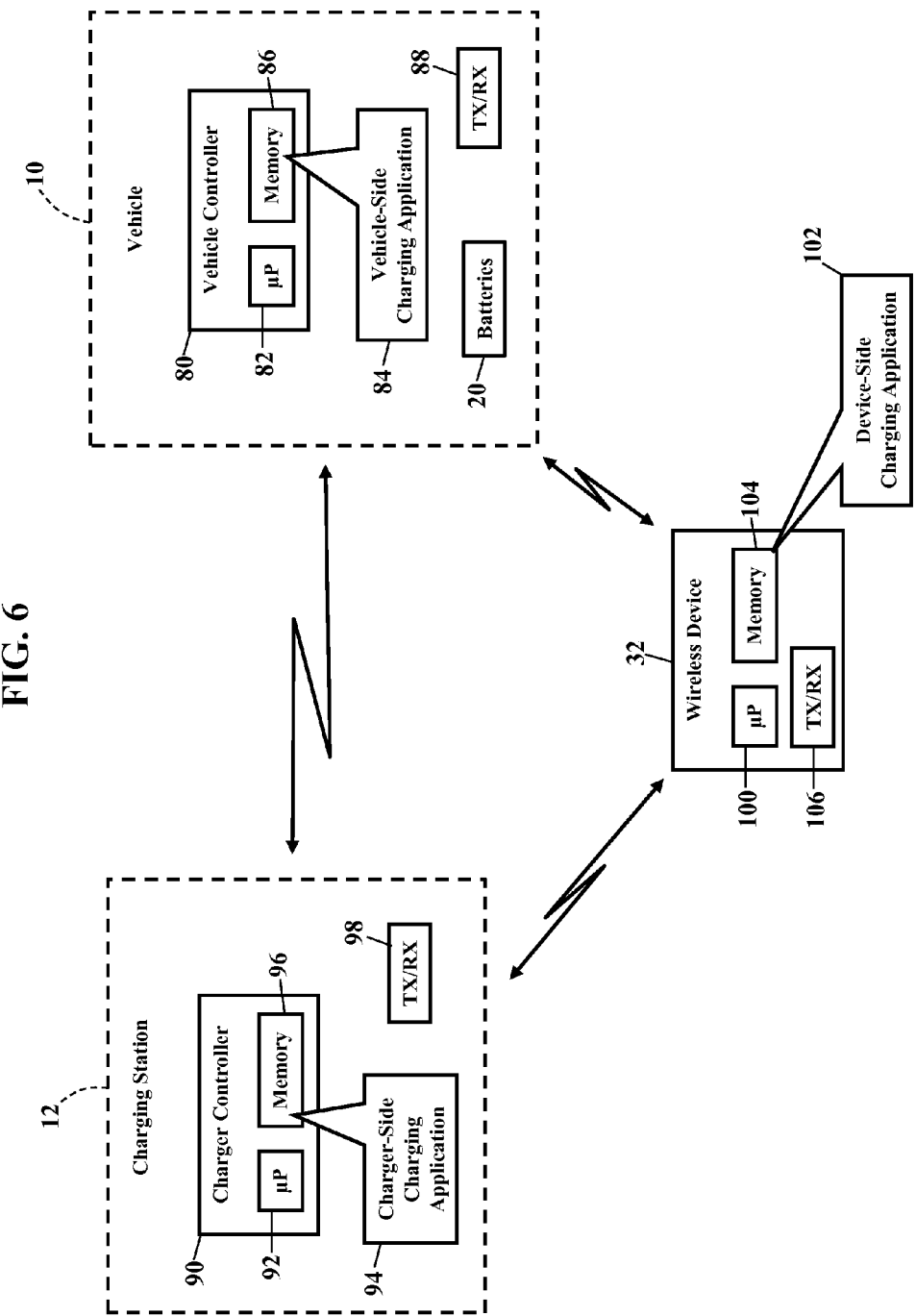
FIG. 6 is a more detailed block diagram illustrating the operating environment, according to exemplary embodiments.

FIG. 6 is a more detailed block diagram illustrating the operating environment, according to exemplary embodiments. Here the vehicle 10 has at least one vehicle controller 80 that interfaces with the charging station 12 and/or with the occupant's wireless device 32. The vehicle controller 80 has a processor 82 (e.g., "µP"), application specific integrated circuit (ASIC), or other component that executes a vehicle-side charging application 84 stored in a memory 86. The vehicle-side charging application 84 is a set of programming, code, or instructions that cause the processor 82 to accept the electrical power (illustrated as reference numeral 14 in FIG. 1) from the charging station 12. The vehicle controller 80 may interface with a wired and/or wireless transceiver 88 to wirelessly communicate with the charging station 12 and/or the wireless device 32 via the communications network (illustrated as reference numeral 36 in FIGS. 2, 4, & 5).

FIG. 6 also illustrates a charger controller 90. The charging station 12 has a processor 92 that executes a charger-side charging application 94 stored in a memory 96. The charger-side charging application 94 is a set of programming, code, or instructions that cause the processor 92 to supply the electrical power 14 to the vehicle. The charging station 12 may also have a wired and/or wireless transceiver 98 to wirelessly communicate via the communications network 36.

The wireless device 32, likewise, may have a processor 100. The wireless device 32 executes a device-side charging application 102 stored in a memory 104. The device-side charging application 102 is a set of programming, code, or instructions that cause the processor 100 to at least help authenticate the charging of the batteries 20 in the vehicle 10. The wireless device 32 also has a transceiver 106 to wirelessly communicate with the vehicle 10 and the charging station 12. Any of the charging station 12, the occupant's wireless device 32, and the vehicle controller 80 may thus participate in the authentication (illustrated as reference numeral 22 in FIG. 1) and may help arrange the charging of the batteries 20. The vehicle-side charging application 84, the charger-side charging application 94, and/or the device-side charging application 102 may thus cooperate to authenticate and to charge the batteries 20 installed in the vehicle 10.

Figure 7:
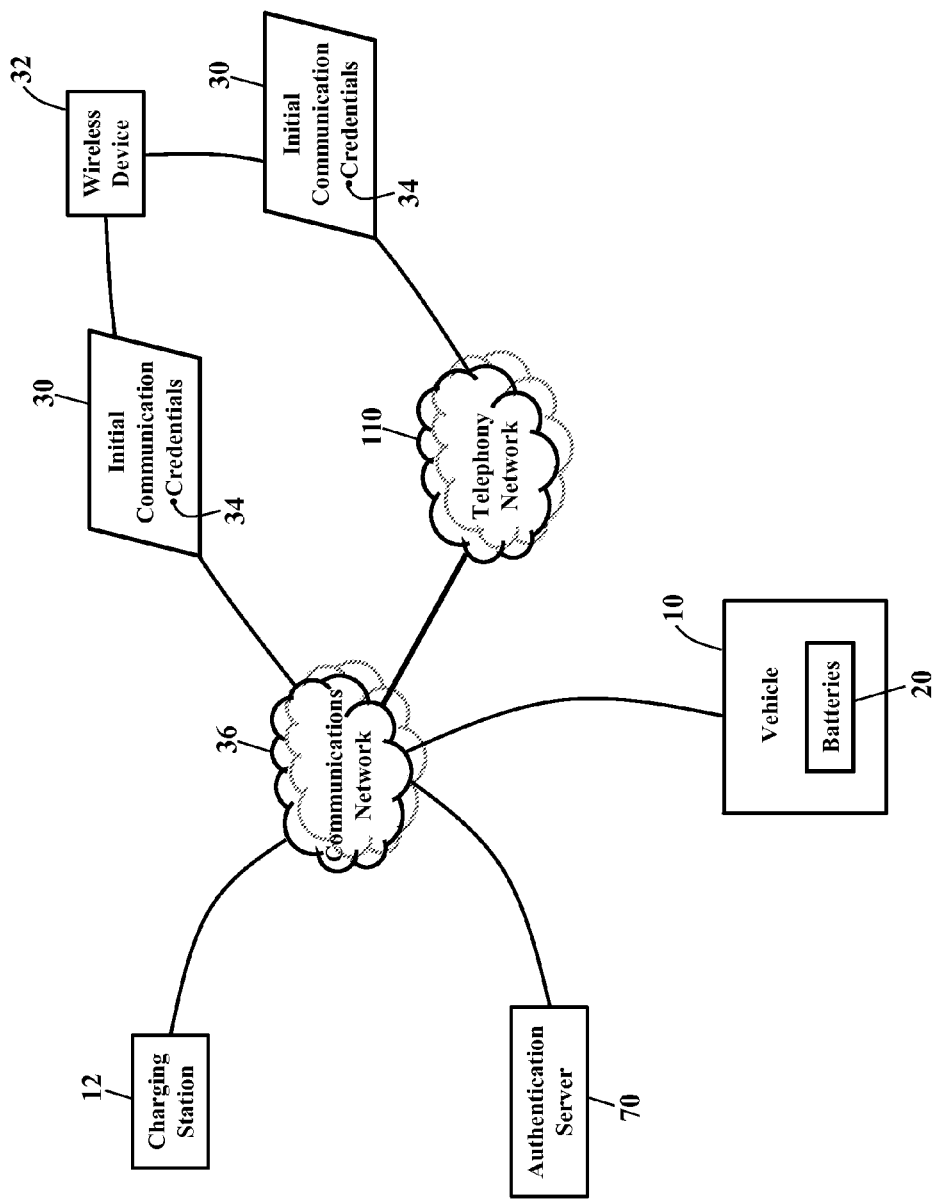
FIGS. 7-9 are detailed illustrations of an initial communication, according to exemplary embodiments.
Figure 8:
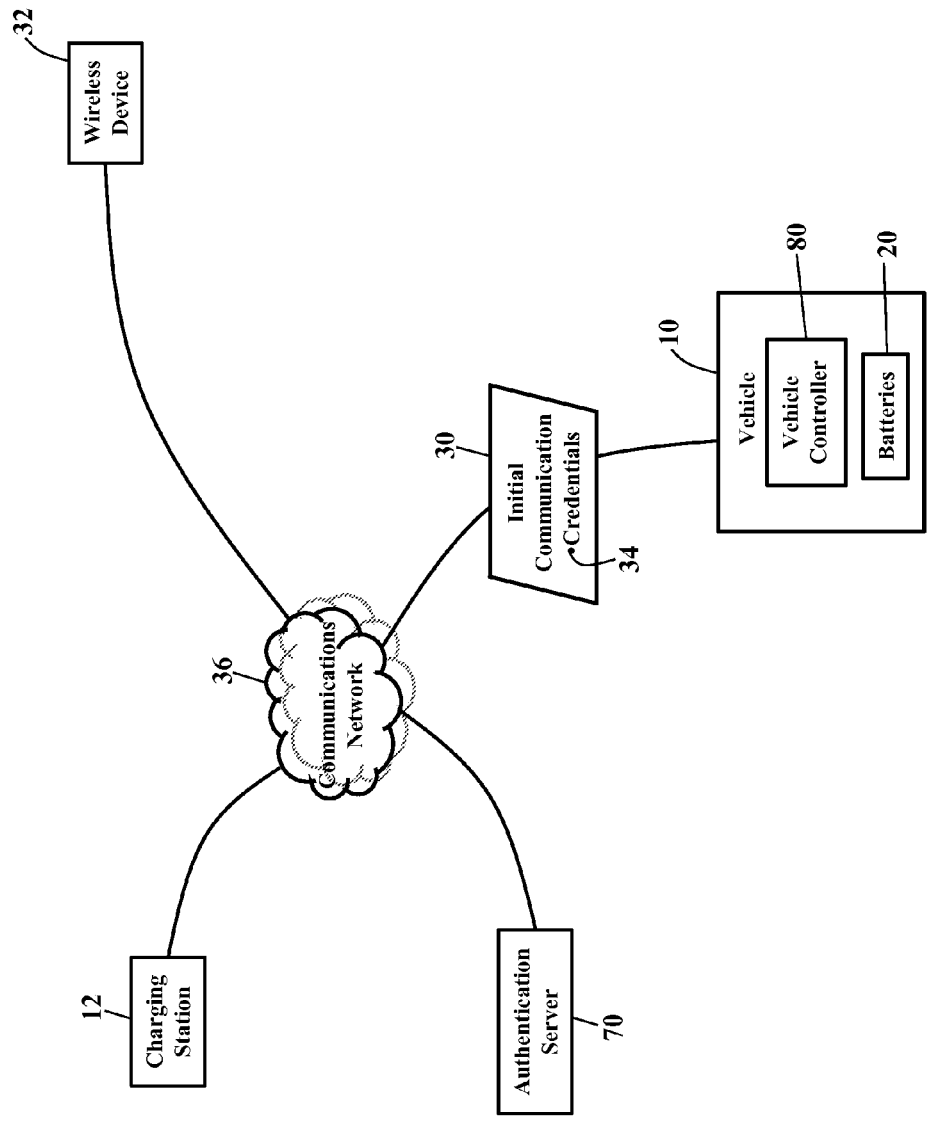
Figure 9:
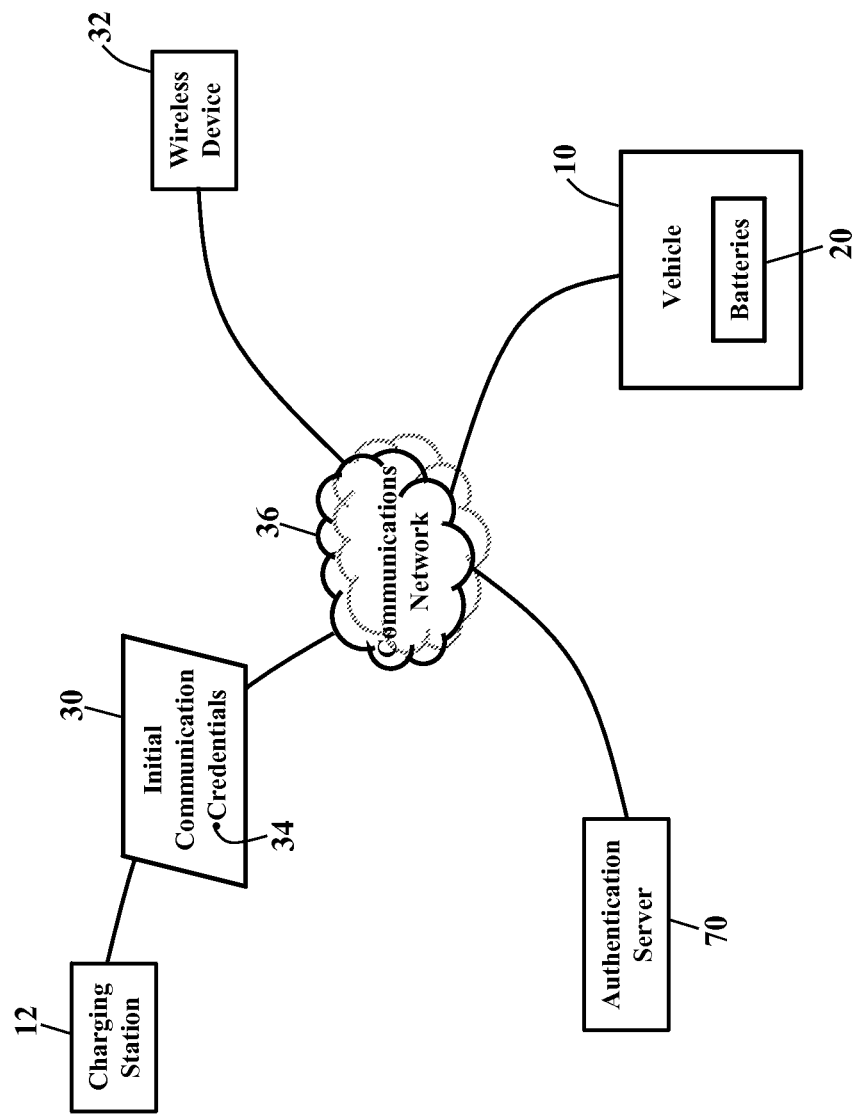

FIGS. 7-9 are more detailed illustrations of the initial communication 30, according to exemplary embodiments. FIG. 7 illustrates how the initial communication 30 may originate from the occupant's wireless device 32. Earlier paragraphs already explained how the driver, for example, may initiate or send the initial communication 30 from the wireless device 32. The wireless device 32, for example, may utilize the communications network 36 to establish communication with the authentication server 70. The driver, however, may alternatively establish the initial communication 30 with the charging station 12. The driver may even use a telephony network 110 (such as the public switched telephone network and/or a cellular network) to call or text message the authentication server 70 and/or the charging station 12. The driver may establish the initial communication 30 and send the authentication credentials 34. If the authentication credentials 34 are verified, then the charging station 12 may be authorized to charge the batteries 20 in the vehicle 10.

FIG. 8 further illustrates the initial communication 30. Here the initial communication 30 originates from the vehicle 10. That is, the vehicle controller 80 may utilize the wireless communications network 36 to establish the initial communication 30. The vehicle controller 80, for example, may interface with the authentication server 70 and/or the charging station 12. When the initial communication 30 is confirmed, the vehicle controller 80 may send the authentication credentials 34. If the authentication credentials 34 are verified, then the charging station 12 may be authorized to charge the batteries 20 in the vehicle 10.

FIG. 9 also further illustrates the initial communication 30. FIG. 9 illustrates how the initial communication 30 may originate from the charging station 12. The charging station 12 may use the communications network 36 to establish the initial communication 30 with the vehicle 10, the wireless device 32, and/or the authentication server 70. The charging station 12 may obtain and send the authentication credentials 34 and receive confirmation of authentication. If the authentication credentials 34 are verified, then the charging station 12 may be authorized to charge the batteries 20 in the vehicle 10.

Figure 10:
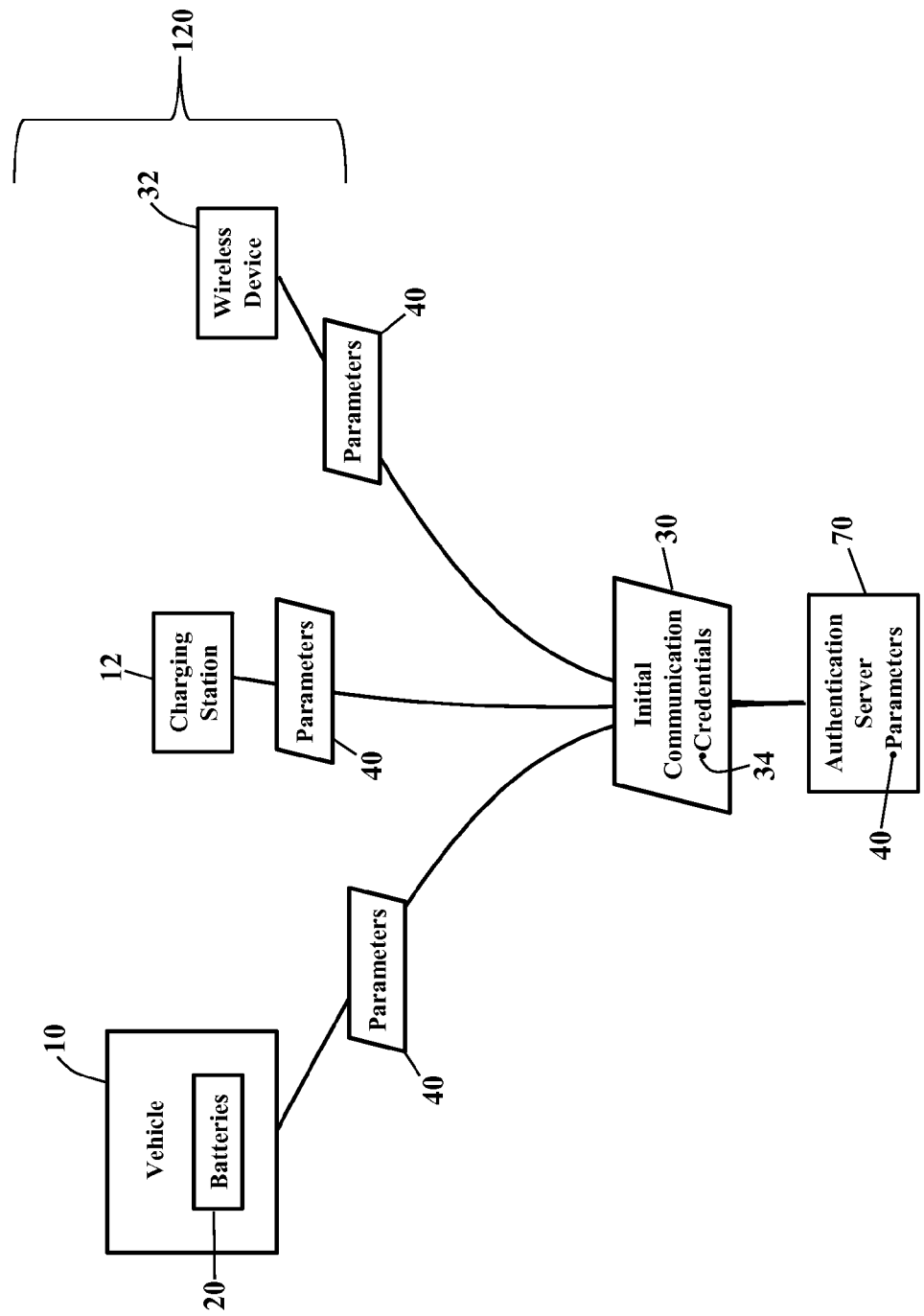
FIG. 10 is a further illustration of the initial communication, according to exemplary embodiments.
Figure 11:
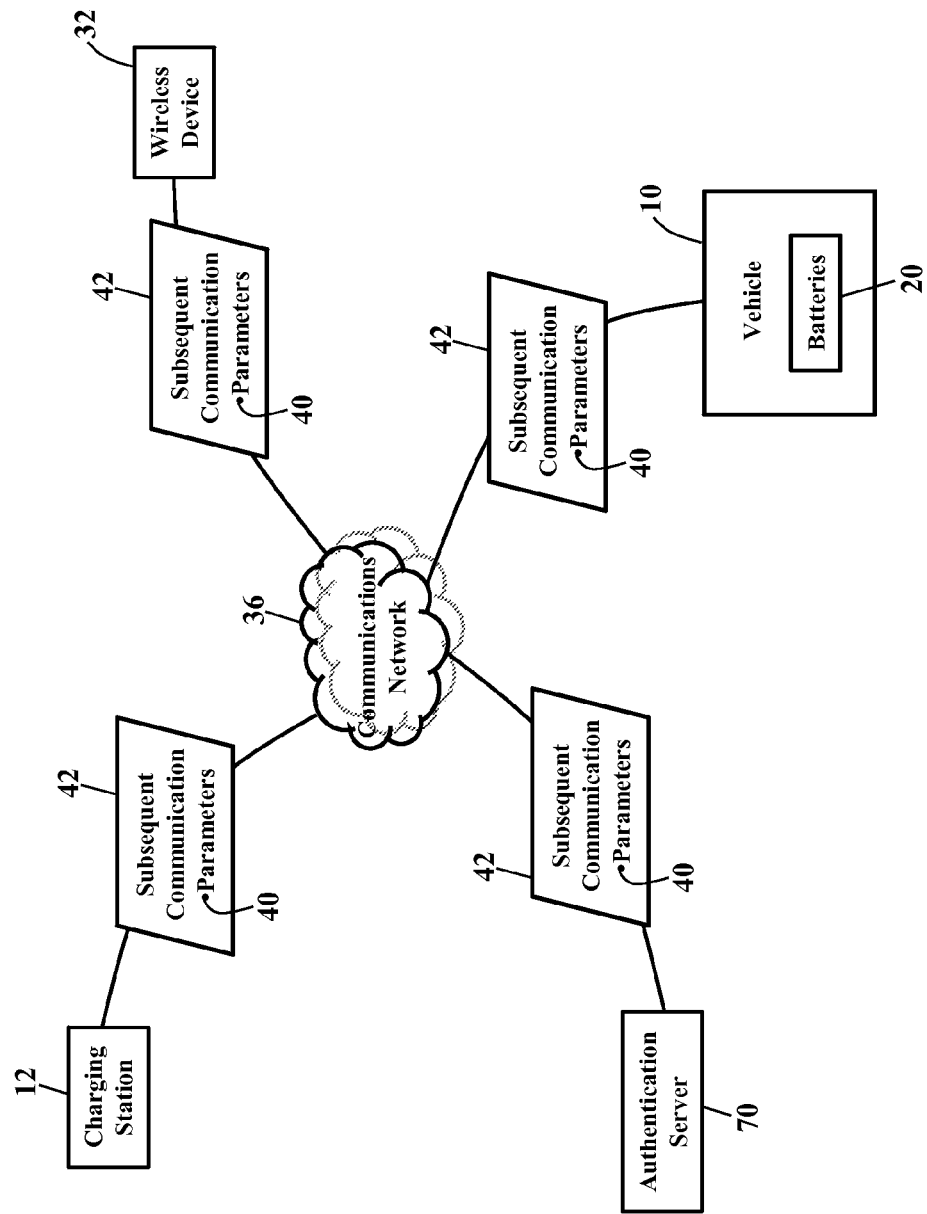
FIGS. 11-14 are illustrations of a subsequent communication, according to exemplary embodiments.

FIG. 10 is a further illustration of the initial communication 30, according to exemplary embodiments. FIG. 10 illustrates how the initial communication 30 may be established between the vehicle 10, the charging station 12, the wireless device 32, and/or the authentication server 70. For simplicity, the vehicle 10, the charging station 12, the wireless device 32 will hereinafter be referred to as client devices 120. The authentication server 70 and any client device 120 thus establish a client-server relationship to transfer the authentication credentials 34. If the authentication credentials 34 are verified, then the authentication server 70 and the client device 120 agree to the one or more parameters 40 of the subsequent communication (illustrated as reference numeral 42 in FIG. 3). That is, the initial communication 30 may only be a preliminary "handshake" that establishes the parameters 40 of the subsequent communication 42. Once the parameters 40 are agreed upon, the initial communication 30 may be terminated and the subsequent communication 42 established at the selected parameter(s) 40. If the subsequent communication 42 exhibits the one or more parameters 40, then the charging station 12 may be authorized to charge the batteries 20 in the vehicle 10. If, however, the subsequent communication 42 has a wrong parameter, then charging may be declined.

FIGS. 11-14 are illustrations of the subsequent communication 42, according to exemplary embodiments. FIGS. 11-14 illustrate how the subsequent communication 42 may be established between any of the vehicle 10, the charging station 12, the wireless device 32, and/or the authentication server 70. Whatever the source and destination of the subsequent communication 42, the subsequent communication 42 may be required to exhibit the one or more parameters 40. A recipient of the subsequent communication 42, for example, may be instructed or required to examine, measure, or filter the subsequent communication 42 sent from a sender. If the subsequent communication 42 has the one or more parameters 40, then the charging station 12 may be authorized to charge the batteries 20 in the vehicle 10. If, however, the subsequent communication 42 has perhaps at least one wrong parameter, then charging may be declined.

Figure 12:
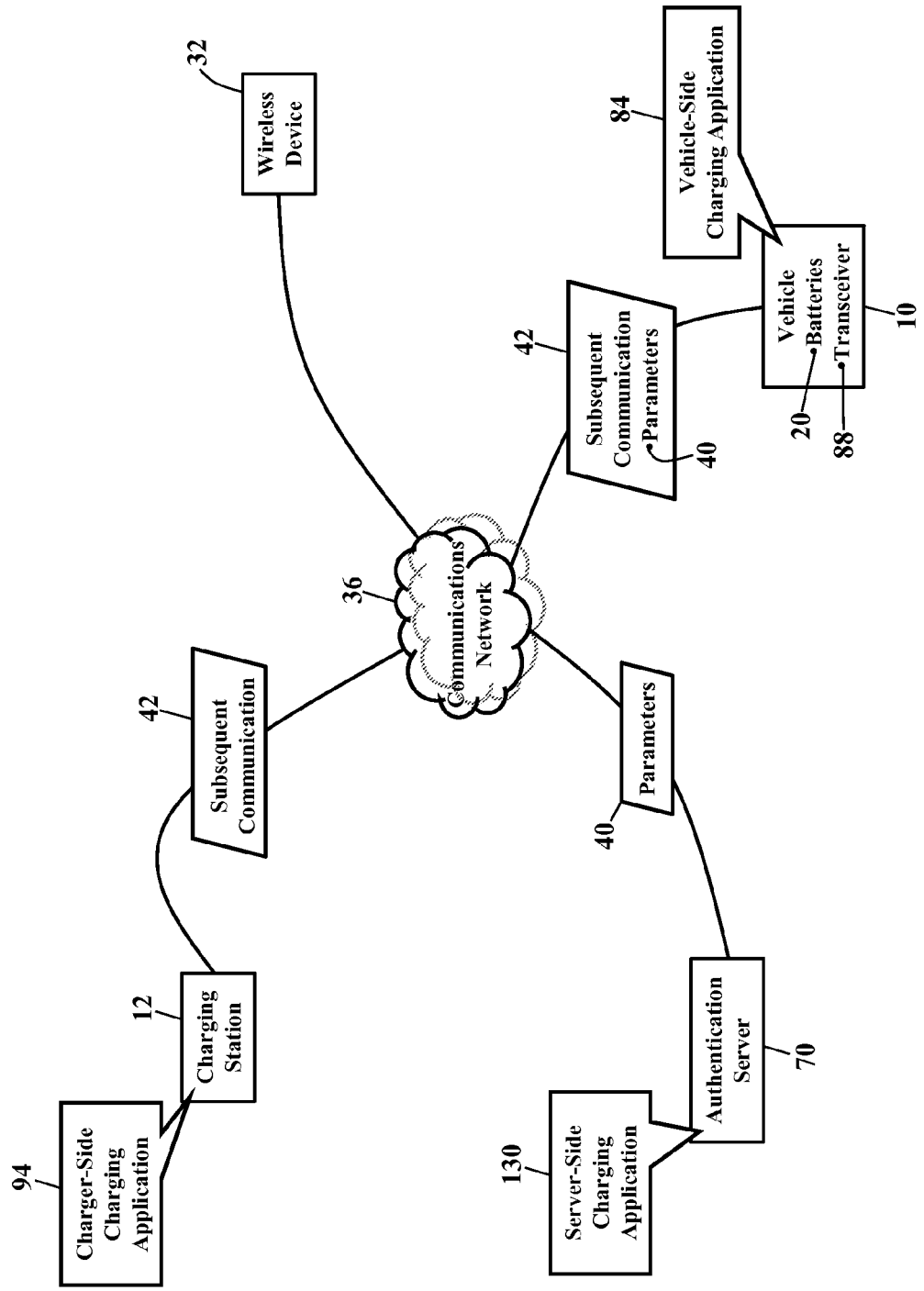

FIG. 12, for example, illustrates the charging station 12. Here the subsequent communication 42 is established between the vehicle 10 and the charging station 12. Once the parameters 40 are established, the authentication server 70 may instruct the vehicle 10 and/or the charging station 12 to establish the subsequent communication 42. The authentication server 70 may send the parameters 40 to the sender and/or recipient as a message or signal. The authentication server 70, for example, may have a processor that executes a server-side charging application 130 stored in memory. The server-side charging application 130 cooperates with the charger-side charging application 94 to select, generate, or retrieve the parameters 40. The transceiver 88 in the vehicle 10 may receive or detect the subsequent communication 42. The vehicle-side charging application 84 causes the transceiver 88, and/or the vehicle controller (illustrated as reference numeral 80 in FIG. 6), to inspect the subsequent communication 42 for the parameters 40. If the subsequent communication 42 possesses or contains the parameters 40, then the vehicle-side charging application 84 may be authorized to accept the electrical power 14 from the charging station 12. If, however, the subsequent communication 42 has at least one incorrect value for any of the parameters 40, then the vehicle-side charging application 84 may cause the vehicle controller 80 to decline or terminate the electrical power 14 from the charging station 12.

Figure 13:
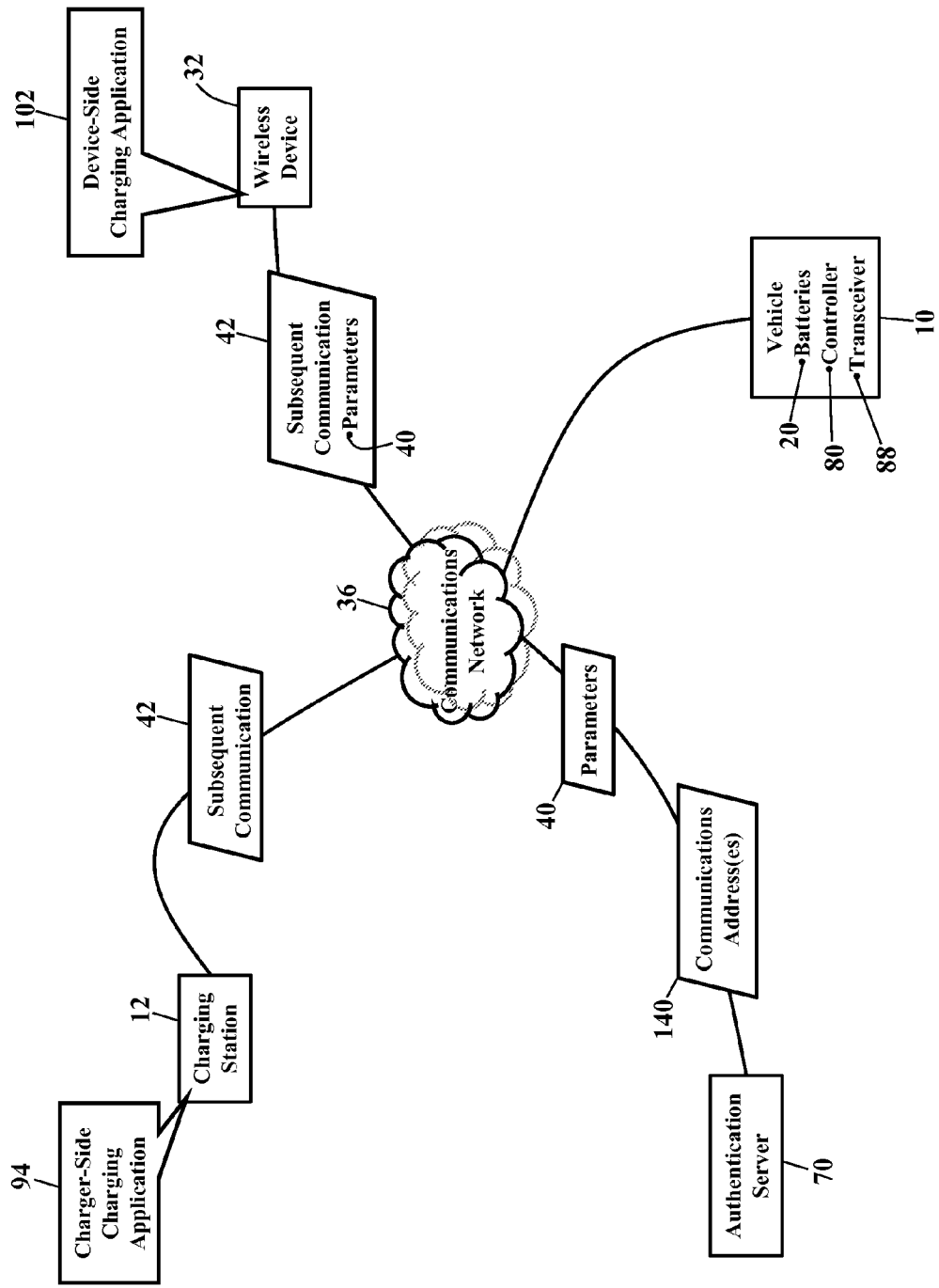

FIG. 13 illustrates the wireless device 32. Here the subsequent communication 42 is established between the charging station 12 and the wireless device 32. Once the parameters 40 are established, the authentication server 70 may instruct the charging station 12 and/or the wireless device 32 to establish the subsequent communication 42. The authentication server 70, for example, may send the communications addresses 140 (e.g., IP address) associated with the sender and receiver (e.g., the charging station 12 and the wireless device 32). The authentication server 70 may also send the parameters 40. The charger-side charging application 94 may thus be instructed to establish the subsequent communication 42 with the wireless device 32. The transceiver (illustrated as reference numeral 106 in FIG. 6) in the wireless device 32 receives or detects the subsequent communication 42, and the device-side charging application 102 may inspect the subsequent communication 42 for the parameters 40. If the subsequent communication 42 possesses or contains the parameters 40, then the wireless device 32 communicates with the charging station 12 and/or the vehicle controller 80 to authorize an acceptance of the electrical power 14. If the subsequent communication 42 fails to have the parameters 40, then the wireless device 32 may instruct the charging station 12 to terminate the electrical power 14.

Figure 14:
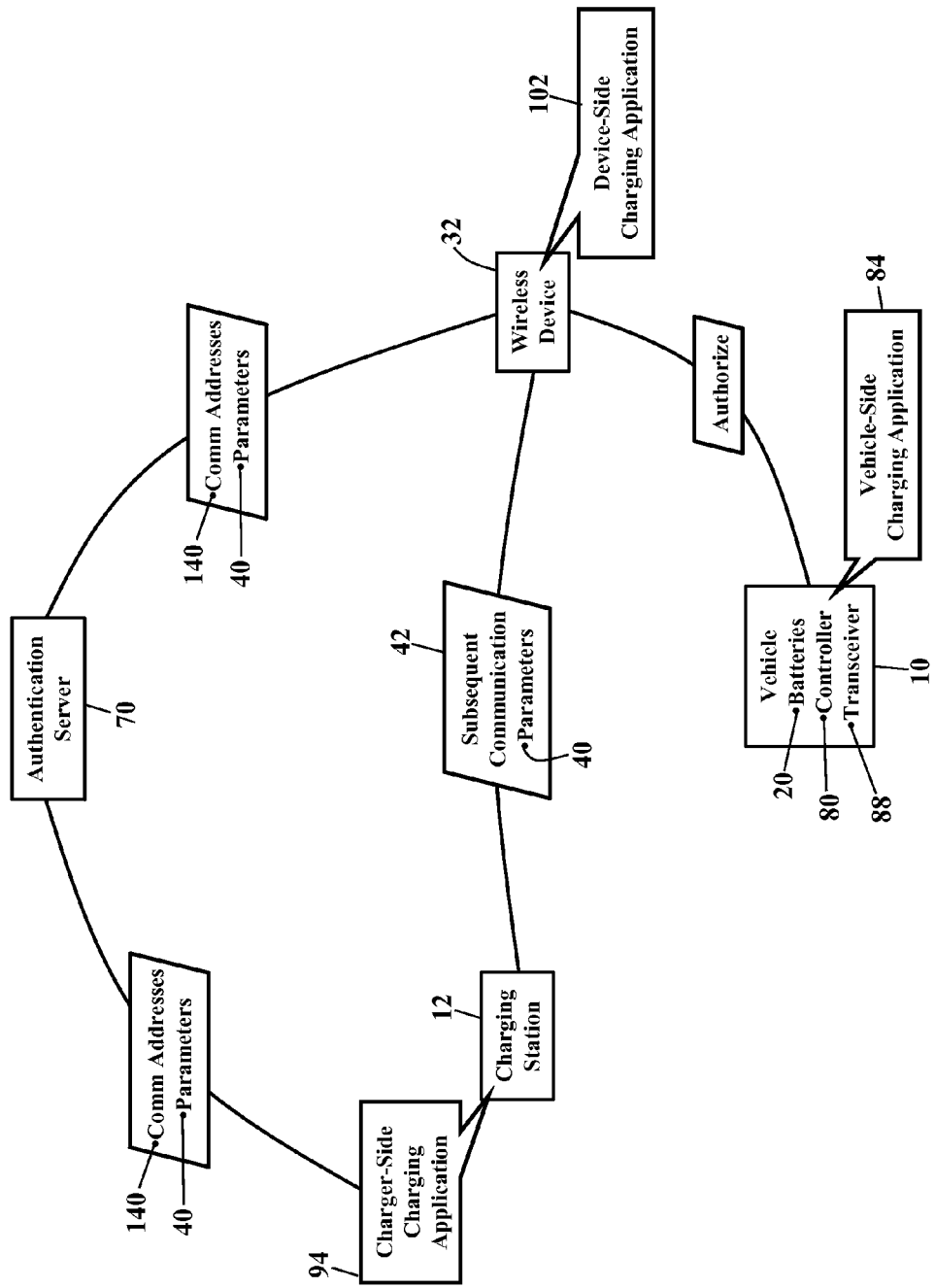

FIG. 14 also illustrates the wireless device 32. Here, though, the wireless device 32 may instruct the vehicle 10 to allow charging. Because FIG. 13 is similar to FIG. 12, the similar features are only briefly discussed. Once the parameters 40 are established, charging station 12 establishes the subsequent communication 42 with the wireless device 32. The device-side charging application 102 inspects the subsequent communication 42 for the parameters 40. If the parameters 40 are verified, here the wireless device 32 instructs the vehicle controller 80 to accept the electrical power (illustrated as reference numeral 14 in FIG. 1) from the charging station 12. The vehicle-side charging application 84 and the device-side charging application 102 interface and communicate to authorize charging the batteries 20. If, however, the subsequent communication 42 fails to have the parameters 40, the device-side charging application 102 may instruct the vehicle-side charging application 84 to terminate receipt of the electrical power 14.

Figure 15:
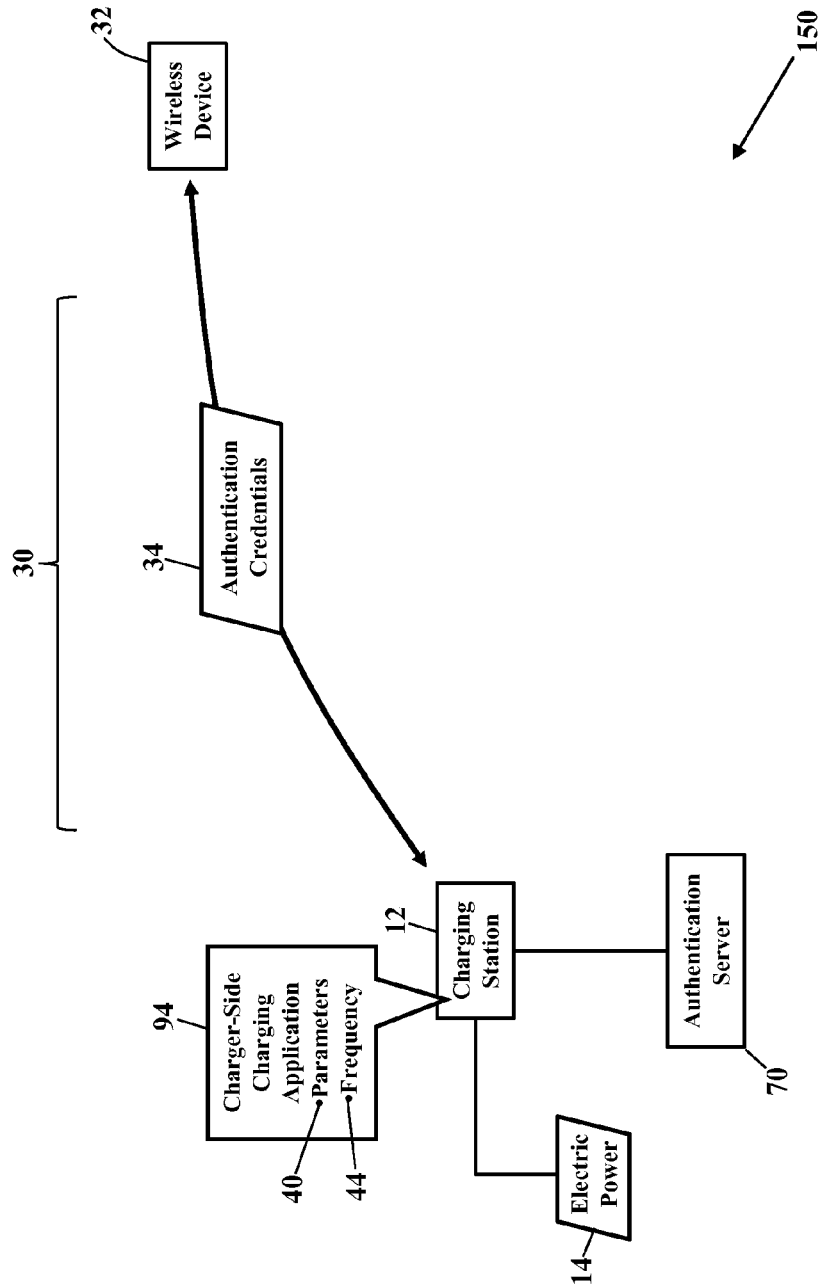
FIGS. 15-17 are diagrams illustrating frequency variation, according to exemplary embodiments.
Figure 16:
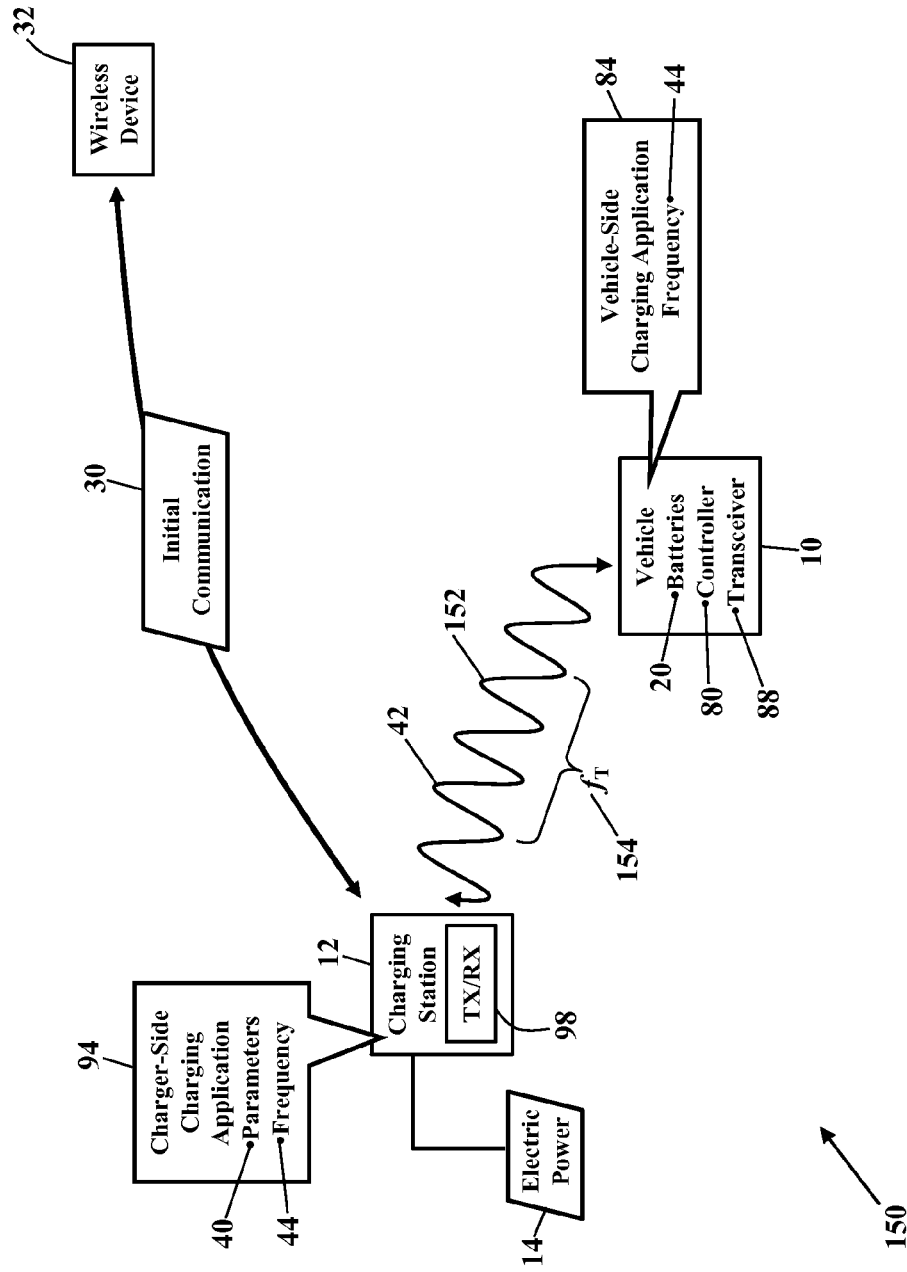
Figure 17:
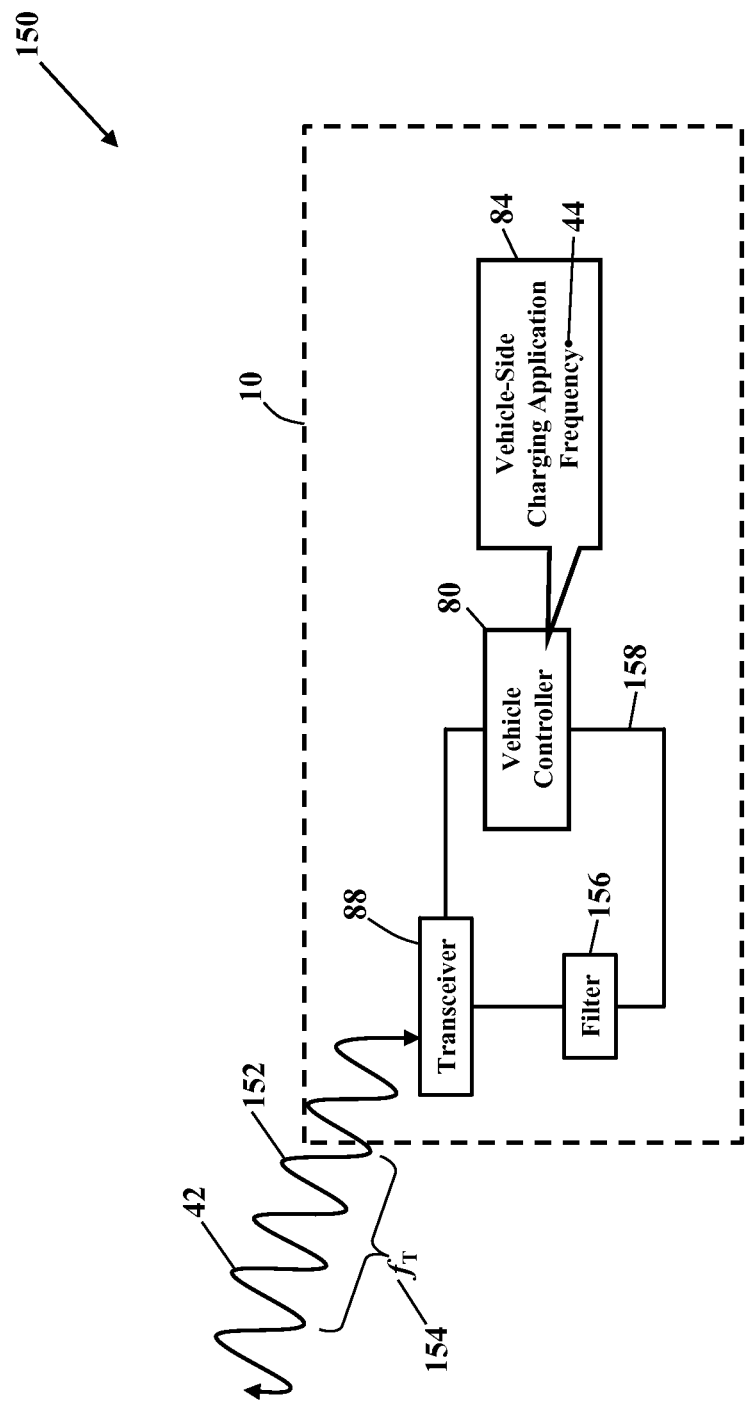

FIGS. 15-17 are diagrams illustrating frequency variation 150, according to exemplary embodiments. Here the parameters 40 may specify the particular frequency 44 at which the subsequent communication 42 must possess. As the earlier paragraphs explained, the initial communication 30 may establish the parameters 40 of the subsequent communication 42. The parameters 40, for example, may include the frequency 44 of the subsequent communication 42. If the subsequent communication 42 has the correct frequency 44, then charging may be authorized. If the frequency 44 is incorrect, then charging may be denied or terminated.

FIG. 15 again illustrates the charging station 12 and the wireless device 32. Here the charging station 12 and the wireless device 32 may establish the initial communication 30 (via the communications network 36 illustrated in previous FIGS.). The wireless device 32 sends the authentication credentials 34 to the charging station 12. The charger-side charging application 94 may itself verify the authentication credentials 34, or the charging station 12 may forward the authentication credentials 34 to the authentication server 70. Regardless, if the authentication credentials 34 are verified, then the parameters 40 of the subsequent communication 42 are selected.

The parameters 40 may include the frequency 44 of the subsequent communication 42. If the subsequent communication 42 has the frequency 44 specified in the initial communication 30, then authorization may be given to charge the batteries 20 in the vehicle 10. FIG. 16 illustrates the charging station 12 sending the subsequent communication 42 as a signal 152 having a transmission frequency ("$f_T$") 154. The transceiver 98 in the charging station 12, for example, may be tunable and be instructed to tune to the frequency 44. The transceiver 98 transmits or broadcasts the signal 152 at the transmission frequency 154. When the signal 152 is received by the transceiver 88 in the vehicle 10, the signal 152 is inspected for the requisite frequency 44. The transceiver 88 in the vehicle 10, for example, may only receive (or be instructed to receive) signals at the frequency 44 (or, more likely, within an upper and lower limit about the frequency 44). If the transmission frequency ("$f_T$") 154 matches the desired frequency 44, then the vehicle-side charging application 84 may accept the electrical power (illustrated as reference numeral 14 in FIG. 1) from the charging station 12. If, however, the transmission frequency 154 is incorrect (or outside an upper and lower limit band), then the vehicle controller 80 may decline or terminate the electrical power 14 from the charging station 12.

FIG. 17 illustrates filtering of signals. When the transceiver 88 in the vehicle 10 receives the subsequent communication 42, the transceiver 88 may send or transfer the signal 152 to a frequency filter 156. The frequency filter 156 may filter or remove components outside a bandwidth of frequencies. If an output signal 158 is detected or received (such as by the vehicle controller 80), then at least a component of the subsequent communication 42 had the desired frequency 44, so charging may be authorized. If no output signal 158 (zero or null) is detected, then the vehicle controller 80 may decline or terminate the electrical power 14 from the charging station 12.

FIGS. 15-17 illustrate the subsequent communication 42 between the charging station 12 and the vehicle 10. Exemplary embodiments, though, may establish the subsequent communication 42 between any of the clients 120 (illustrated in FIG. 10). That is, the subsequent communication 42 may be sent/received to/from any of the clients 120. Because any of the sender/receiver devices (e.g., the clients 120) may send or receive the subsequent communication 42, any of the clients 120 may be configured to include the frequency filter 156. If the output signal 158 is detected or received, then the subsequent communication 42 had at least the desired frequency 44, so charging may be authorized.

Figure 18:
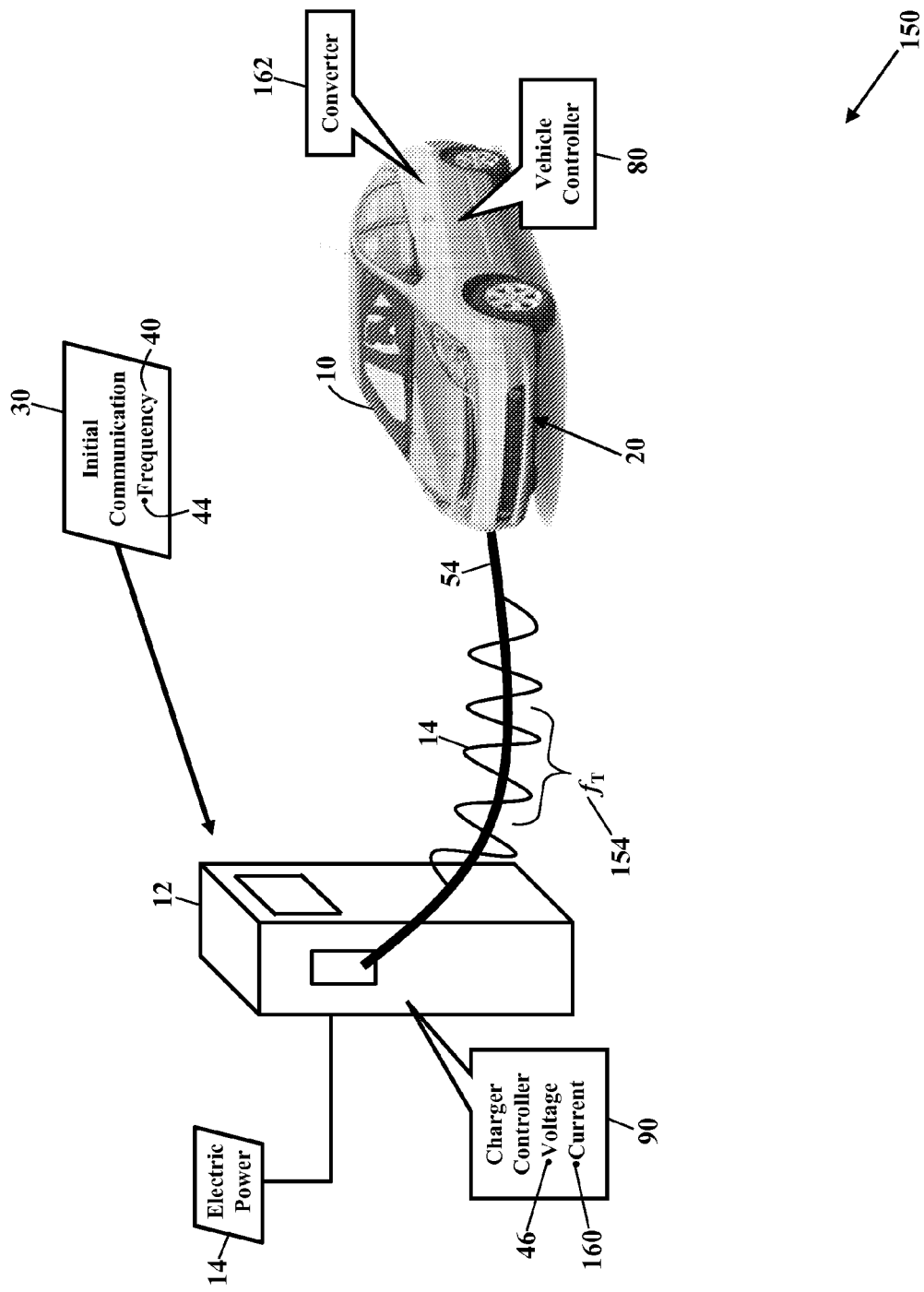
FIG. 18 is another diagram illustrating frequency variation, according to exemplary embodiments.

FIG. 18 is another diagram illustrating the frequency variation 150, according to exemplary embodiments. Here, though, exemplary embodiments may specify the frequency 44 of the electrical power 14 delivered to the vehicle 10. That is, exemplary embodiments may specify the frequency 44 of a current 160 and/or the voltage 46 of the electrical power 14 sent along the charging cord 54 (or inductively transmitted). The frequency 44 may be established from the initial communication 30, as earlier paragraphs explained. Exemplary embodiments may even establish or set the current 160 and/or voltage 46 of the electrical power 14 sent along the charging cord 54. That is, the subsequent communication 42 may include the physical and electrical interface between the vehicle 10 and the charging station 12. If the vehicle controller 80 and the charger controller 90 establish communication, the parameters 40 may require the particular current 160 or voltage 46 of the electrical power 14 sent over the charging cord 54. The charger controller 90 may thus be instructed to send the electrical power 14 at the current 160 or voltage 46 expected by the vehicle controller 80. The parameters 40 may even specify the transmission frequency ("$f_T$") 154 of the current 160 or voltage 46. The vehicle controller 80 may then inspect or measure the transmission frequency 154, the current 160, and/or the voltage 46. If the current 160 or voltage 46 has the specified value (e.g., volts or amps), and/or the desired or required frequency 44 (e.g., Hertz), then the electrical power 14 may be accepted. The vehicle controller 80 may then cause the electrical power 14 to be passed or transferred to a converter 162 (if AC/DC conversion is required). If, however, one or more of the parameters 40 are incorrect, the vehicle controller 80 may decline or terminate the electrical power 14 from the charging station 12. That is, the vehicle controller 80 may decline to charge the batteries 20 in the vehicle 10.

Figure 19:
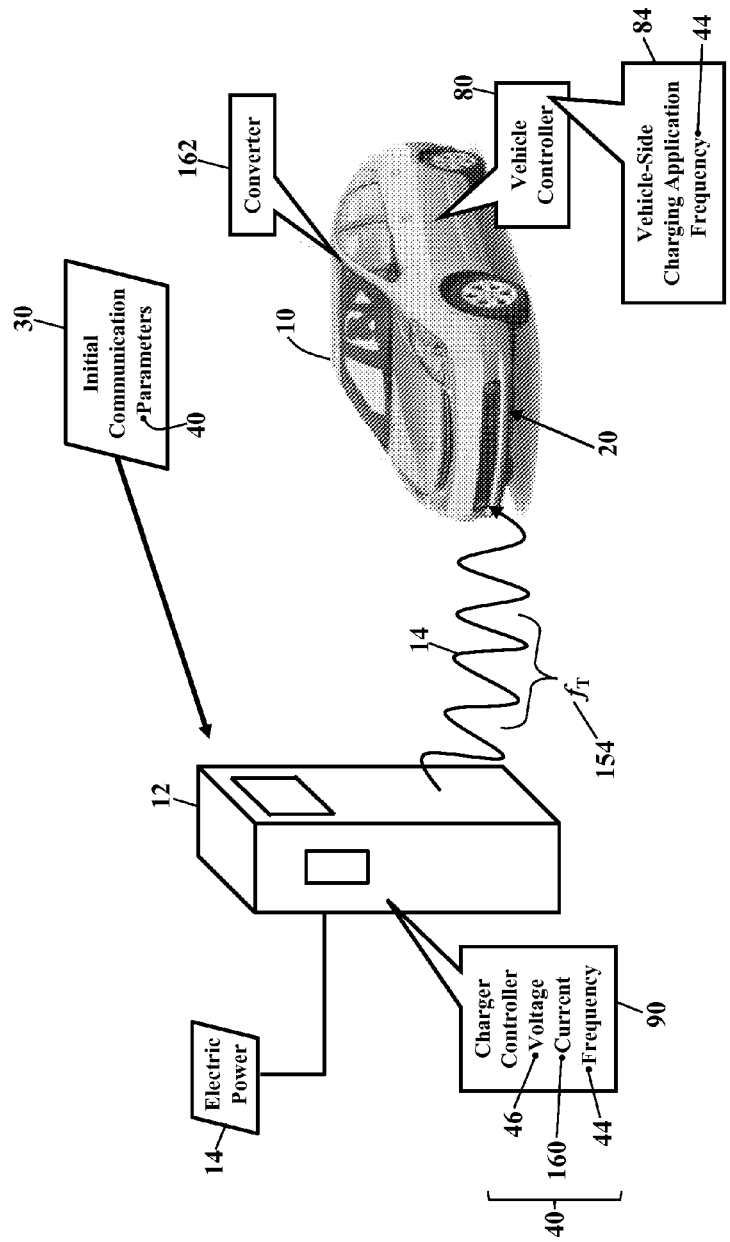
FIGS. 19-20 are diagrams illustrating wireless charging, according to exemplary embodiments.

FIG. 19 is a diagram illustrating wireless charging, according to exemplary embodiments. As the above paragraphs have mentioned, the vehicle 10 and the charging station 12 may wirelessly charge the batteries 20. That is, instead of transferring the electrical power 14 along the physical charging cord (illustrated as reference numeral 54 in FIG. 18), exemplary embodiments may inductively charge the batteries 20 in the vehicle 10. Inductive charging is generally known, though, so this disclosure will not dwell on the known concepts. Here, though, the initial communication 30 establishes the parameters 40 of the subsequent communication 42. The initial communication 30, as before, may be established between any of the clients 120. Regardless of the sender and receiver device, the initial communication 30 establishes the parameters 40 of the subsequent communication 42. The parameters 40 of the subsequent communication 42 may include the voltage 46, the current 160, and/or the frequency 44 of the electrical power 14 that is inductively coupled between the charging station 12 and the vehicle 10. Should the charger controller 90 and the vehicle controller 80 establish wireless communication, the charger controller 90 may be instructed to transmit one or more electromagnetic signals at the current 160, voltage 46, and/or the frequency 44 expected by the vehicle controller 80. If the current 160 or voltage 46 has the specified value (volts or amps), and/or the desired or required frequency 44 (e.g., Hertz), then the vehicle controller 80 may accept the electrical power 14. The vehicle controller 80 may cause the electrical power 14 to be passed or transferred to the converter 162 to charge the batteries 20. If the parameters 40 are incorrect, though, the vehicle controller 80 may decline to charge the batteries 20 in the vehicle 10.

Figure 20:
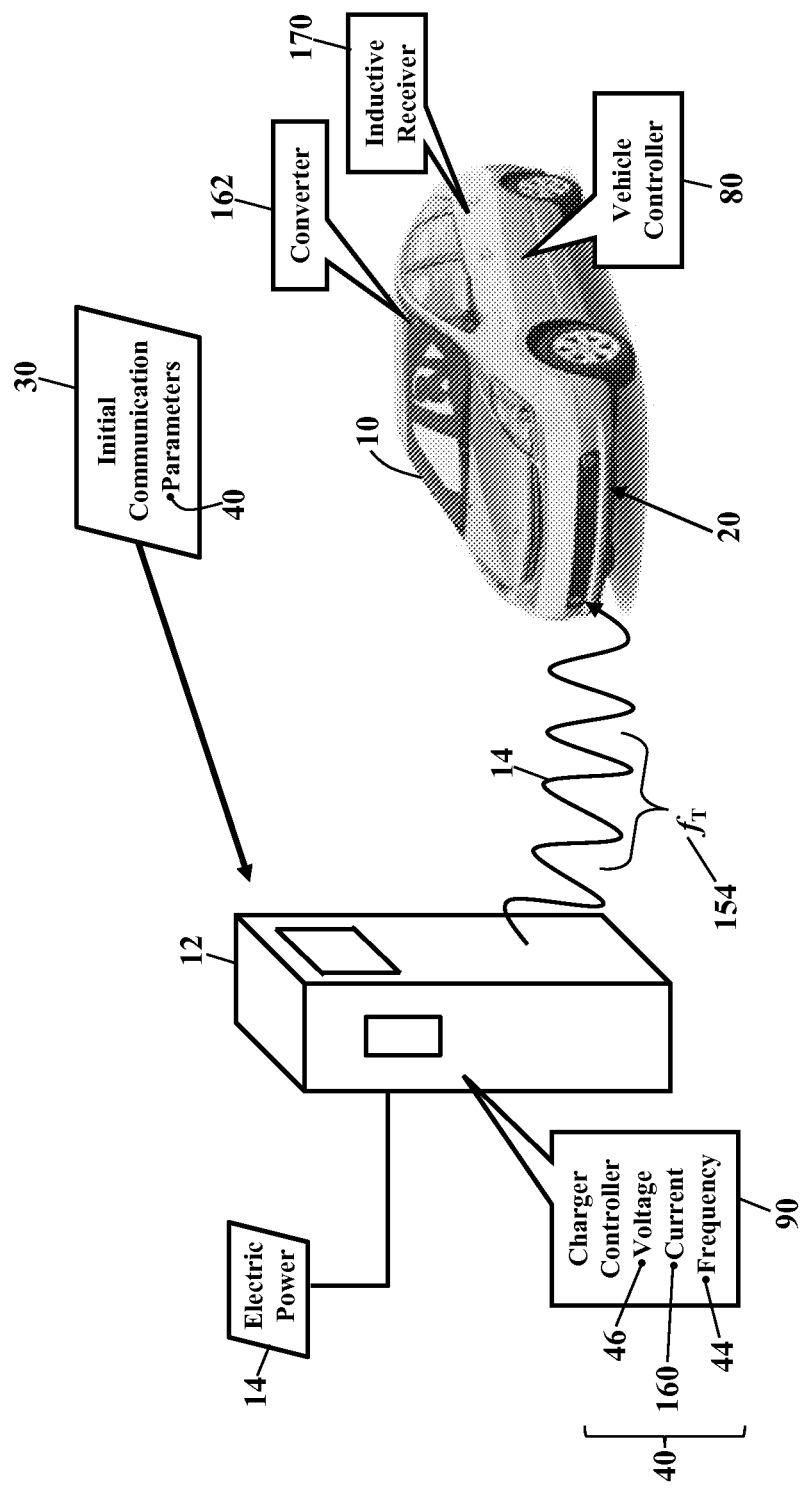

FIG. 20 is another diagram illustrating wireless charging, according to exemplary embodiments. Here the vehicle 10 may only accept the electrical power 14 at the frequency 44. That is, when the charger controller 90 and the vehicle controller 80 establish wireless communication, the charger controller 90 may be instructed to condition or transform the electrical power 14 to the charging frequency 44 expected by the vehicle 10. If the current 160 or voltage 46 is transmitted at the proper frequency 44, then the vehicle 10 may accept the electrical power 14. The vehicle 10, for example, may have an inductive receiver 170 that will only receive signals of a specified frequency (or within a reception bandwidth). If the transmission frequency ("$f_T$") 154 of the electrical power 14 matches the reception bandwidth of the inductive receiver 170, then the vehicle controller 80 may accept the electrical power 14. Suppose, for example, that the inductive receiver 170 has an inductive coil having a resonant frequency. If the transmission frequency ("$f_T$") 154 of the electrical power 14 matches the resonant frequency of the inductive coil, then the electrical power 14 will energize the inductive coil. The vehicle controller 80 may thus accept the electrical power 14 and charge the batteries 20. If the charging frequency 44 is incorrect, though, the inductive receiver 170 may not receive the electrical power 14.

Figure 21:
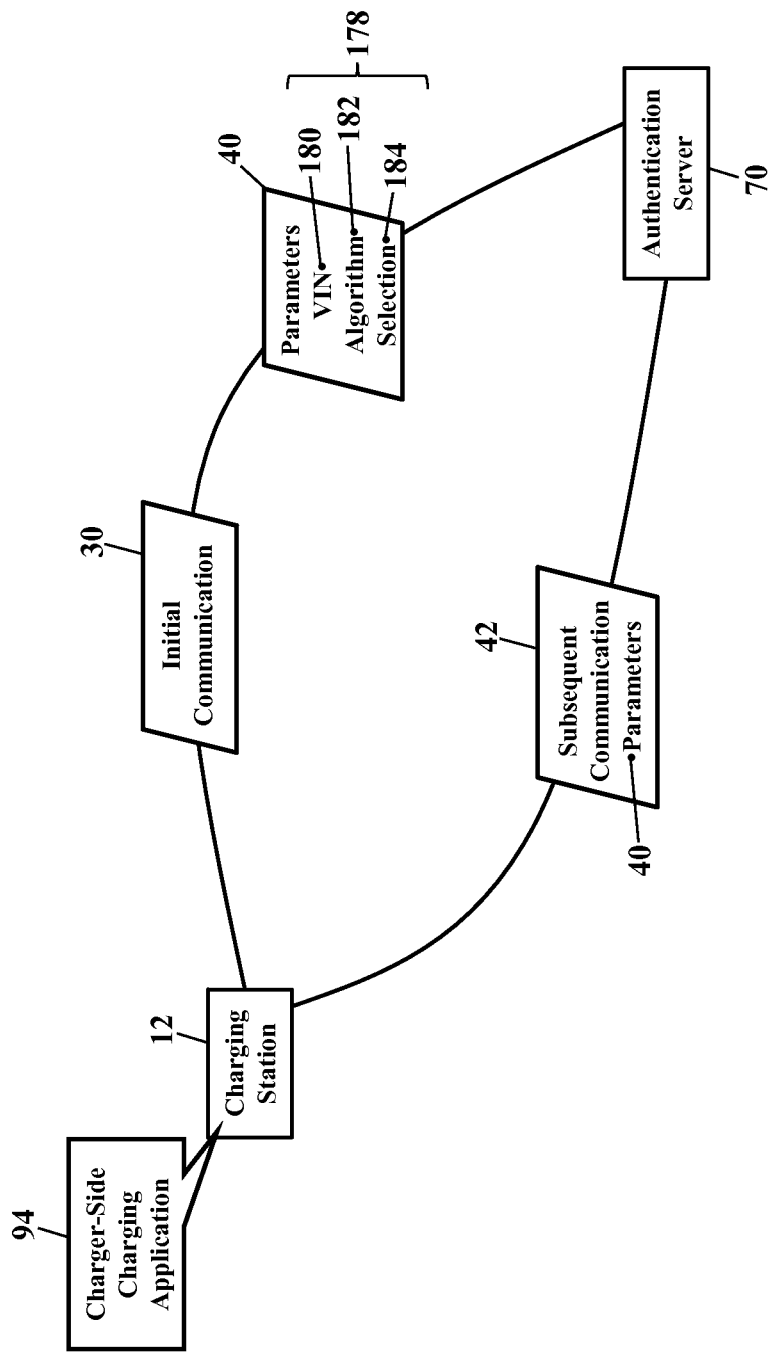

FIGS. 21-25 are diagrams illustrating selection of the parameter(s) 40, according to exemplary embodiments. As the earlier paragraphs explained, the initial communication 30 may establish the parameters 40 of the subsequent communication 42. FIG. 21 illustrates selection criteria 178 for determining the parameters 40 of the subsequent communication 42. Suppose, for example, the authentication server 70 and the charging station 12 establish the initial communication 30. The authentication server 70 and the charging station 12 agree to the parameters 40 of the subsequent communication 42. The parameters 40, for example, may be determined from a vehicle identification number ("VIN") 180. The parameters 40, however, may additionally or alternatively be calculated using an algorithm 182. The parameters 40 may even be determined by selection 184 (such as in a graphical user interface). If the subsequent communication 42 exhibits the parameters 40, then the batteries 20 may be charged.

Figure 22:
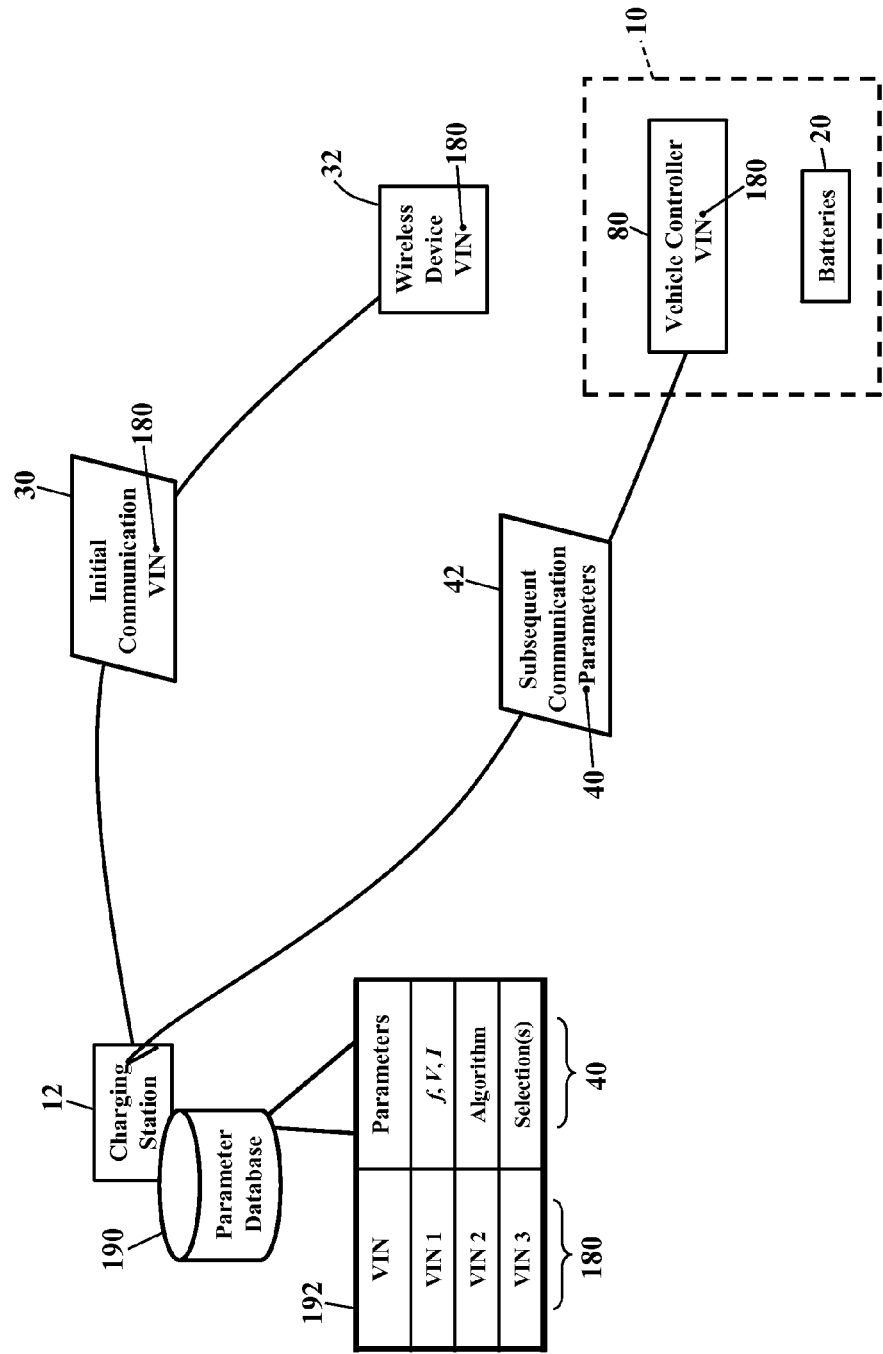

FIG. 22 further illustrates the vehicle identification number 180. As those of ordinary skill in the art understand, the vehicle identification number 180 is a unique serial number that identifies the vehicle 10. When the initial communication 30 is established, the sender and receiver devices may retrieve and send the vehicle identification number 180 assigned to the vehicle 10. FIG. 22, for example, illustrates the initial communication 30 established between the occupant's wireless device 32 and the charging station 12. The wireless device 32 may interface with the vehicle controller 80 and retrieve the vehicle identification number 180. The wireless device 32 may even store the vehicle identification number 180 in its memory (illustrated as reference numeral 104 in FIG. 6). Regardless, the wireless device 32 may send the vehicle identification number 180 to the charging station 12. The charging station 12 may then query for the parameters 40 associated with the vehicle identification number 180.

FIG. 22, for example, illustrates a parameter database 190. The parameter database 190 associates vehicle identification numbers 180 to the parameters 40. The parameter database 190 is illustrated as being locally stored in the memory of the charging station 12, but the parameter database 190 may be remotely stored and accessed. The parameter database 190 is illustrated as a table 192 that maps, relates, or associates the vehicle identification number 180 to the charging parameters 40. The charging station 12 (e.g., the charger controller 90) retrieves the one or more parameters 40 associated with the vehicle identification number 180. The charging station 12 may then establish the subsequent communication 42 at the parameters 40 specified by the vehicle identification number 180. If the vehicle controller 80 verifies the parameters 40, the batteries 20 in the vehicle 10 may be charged.

Figure 23:
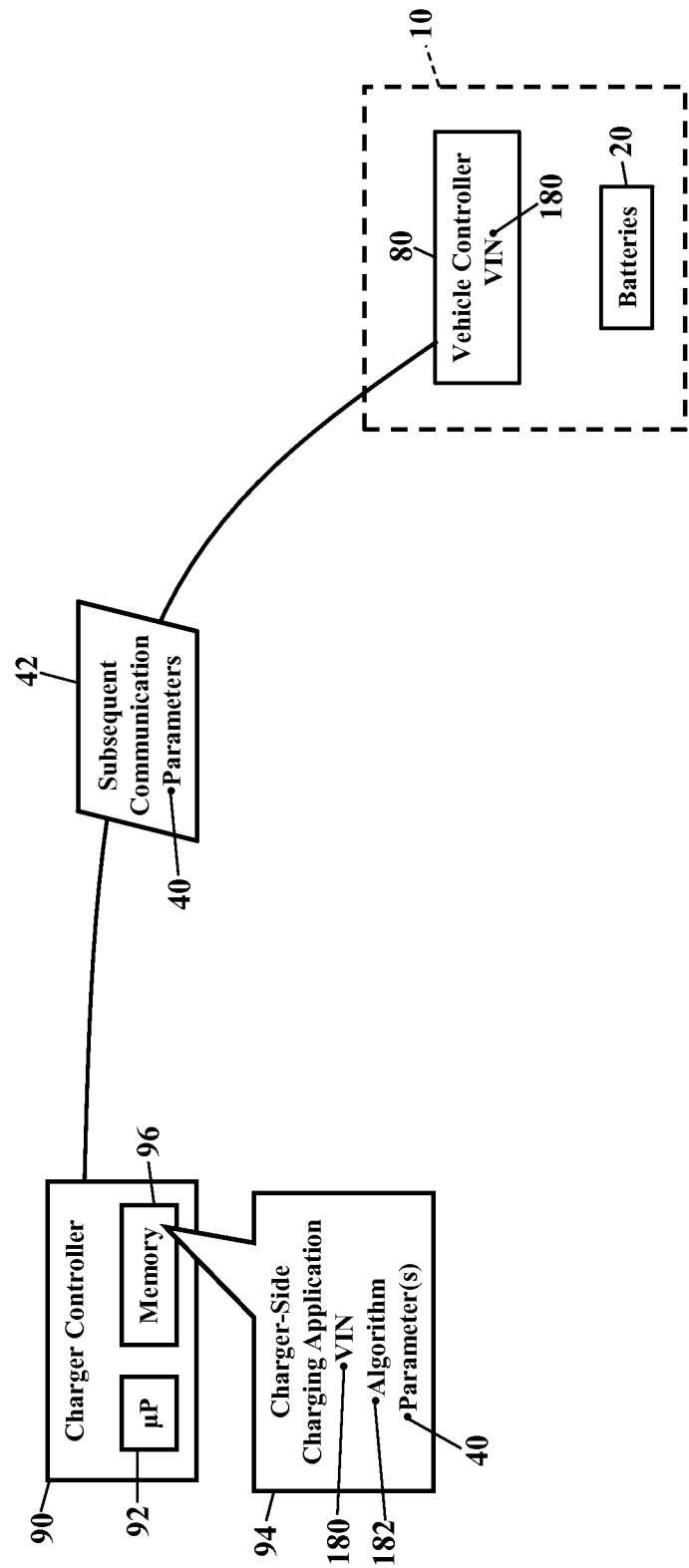

FIG. 23 further illustrates the algorithm 182. Once the vehicle identification number 180 is known, the algorithm 182 may be retrieved and used to calculate one or more of the parameters 40. FIG. 23, for example, illustrates the charger-side charging application 94 retrieving and executing the algorithm 182. The algorithm 182, though, may be stored in, retrieved from, and/or executed by any of the clients (illustrated as reference numeral 120 in FIG. 10). Regardless, the algorithm 182 is executed to determine any parameter 40. The parameters 40 are then established for the subsequent communication 42 to charge the batteries 20 in the vehicle 10.

The algorithm 182 may be a function of the vehicle identification number 180. However the vehicle identification number 180 is obtained, the vehicle identification number 180 may be used to calculate one or more of the parameters 40. The vehicle identification number 180, for example, may be any alphanumeric combination that uniquely identifies the vehicle 10. One or more of the parameters 40 may thus be calculated from Parameter=$f$(VIN).

FIG. 24, for example, illustrates a numerical multiplier 200. While exemplary embodiments may use all, or any portion, of the vehicle identification number 180, the parameter 40 may be calculated from an all-numeric sequential portion 202 (such as a last several digits). The algorithm 182 may read, strip, truncate, or otherwise obtain an end portion of serialized digits. These serialized digits may then be used to calculate one or more of the parameters 40. The algorithm 182, for example, may calculate the numerical multiplier 200 from the sequential portion 202. The numerical multiplier 200 may then be used to calculate the parameters 40. A reference number 204 may be retrieved (perhaps from the memory 96 of the charger controller 90) to normalize the parameter 40. The reference number 204 may be any number, and can be chosen to make the numerical multiplier 200 less than, or greater than, 1. As FIG. 24 illustrates, if the last five (5) digits of the vehicle identification number 180 are "12345" (e.g., the sequential portion 202) and the reference number is 10000, then the numerical multiplier 200 is 1.2345. If, however, the reference number is 20000, then the numerical multiplier 200 is 0.61725.

Whatever the numerical multiplier 200, the parameter 40 may be calculated. Suppose the charging station 12 receives a base voltage of 220 Volts from the electrical grid (illustrated as reference numeral 16 in FIG. 1). If the numerical multiplier 200 is (0.61725), then the charging station 12 may be instructed to charge the batteries 20 at a lesser, conditioned voltage of (0.61725)×(220 Volts)=135.8 Volts.

The numerical multiplier 200 may, likewise, be applied to calculate the charging current 160 and/or the charging frequency 44. If the charging station 12 receives a base frequency of (60) Hertz from the electrical grid 16, then the charging station 12 may be instructed to send the charging frequency 44 of (0.61725)×(60 Hertz)=37.04 Hertz.

Exemplary embodiments may thus use the vehicle identification number 180 to calculate one or more of the parameters 40 for charging the batteries 20.

Transliteration may also be used. The vehicle identification number 180 may include both letters and numbers. Transliteration removes some or all of the letters and substitutes numerical counterparts. Each letter, in other words, is replaced with a numerical substitute. The vehicle identification number 180 may thus be transliterated into an all-numeric value. Exemplary embodiments may then utilize an appropriate reference number 204 to again make the numerical multiplier 200 less than, or greater than, 1.

Figure 25:
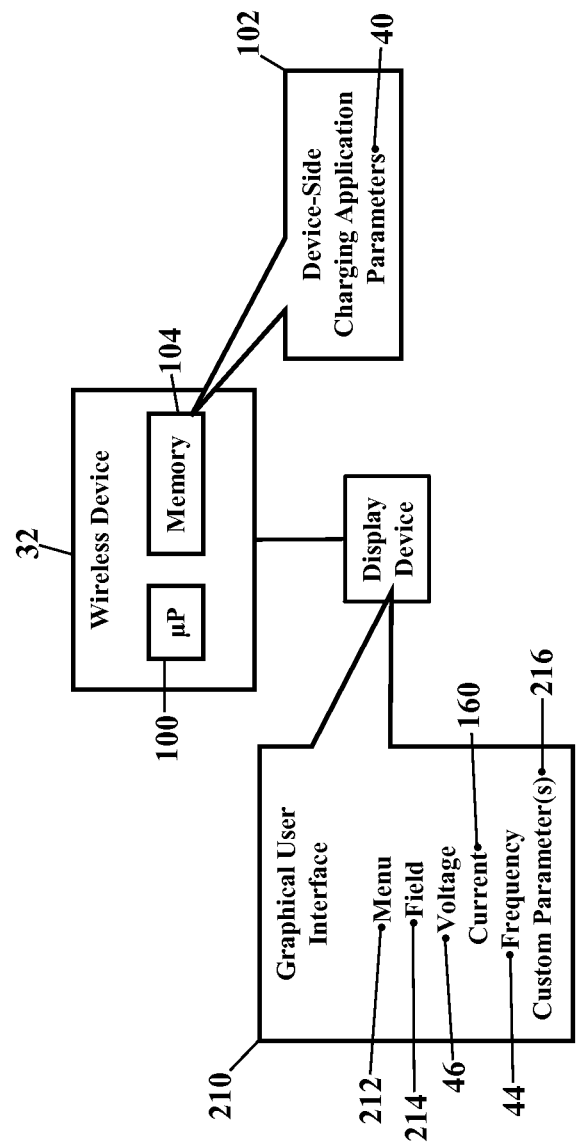

FIG. 25 illustrates a graphical user interface 210, according to exemplary embodiments. The graphical user interface 210 is illustrated as being visually displayed on a display device 212 of the wireless device 32. The graphical user interface 210, however, may be generated by the vehicle controller 80, the charger controller 90, and/or the authentication server 70. Regardless, the graphical user interface 210 may allow a user (such as the user of the wireless device 32) to select the parameters 40 of the subsequent communication (illustrated as reference numeral 42 in previous FIGS.). Here the graphical user interface 210 may prompt the user to select the parameters 40 of the subsequent communication 42. The graphical user interface 210, for example, may display menus 212 and fields 214 for inputs. Continuing with previous examples, the user may be prompted to enter the charging voltage 46, current 160, and/or frequency 44 that is acceptable to the vehicle controller 80. The user may even configure or establish custom parameters 216 of the user's choosing. Whatever the prompts, the subsequent communication 42 may be required to exhibit or possess the parameters 40 to charge the batteries 20.

Figure 26:
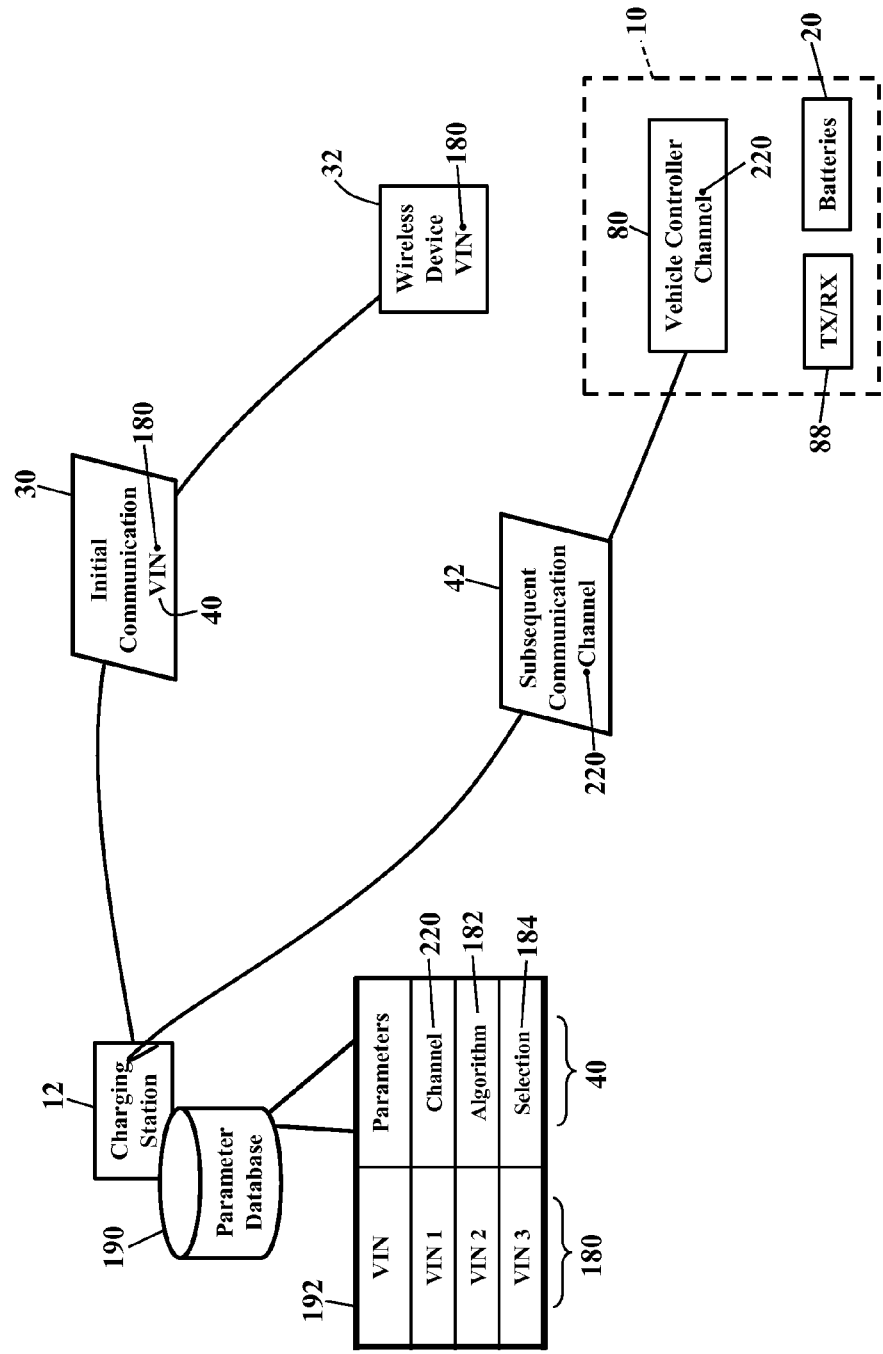
FIG. 26 is a diagram illustrating channel determination, according to exemplary embodiments.

FIG. 26 is a diagram illustrating channel determination, according to exemplary embodiments. Here the initial communication 30 may establish a channel 220 at which the subsequent communication 42 must occur. The channel 220 may be a range or band of frequencies at which the subsequent communication 42 must occur. If, for example, the subsequent communication 42 is transmitted at the incorrect channel, then the vehicle controller 80 may deny charging. For example, the channel 220 may be chosen based on the vehicle identification number 180 and/or calculated by the algorithm 182. The channel 220 may also be chosen at least in part by the selection 184 in the graphical user interface 210. However the channel 220 is determined, the subsequent communication 42 may be required to exhibit or possess the channel 220 to charge the batteries 20. If the transceiver 88 and/or the vehicle controller 80 detects a wrong channel, charging may be denied.

Figure 27:
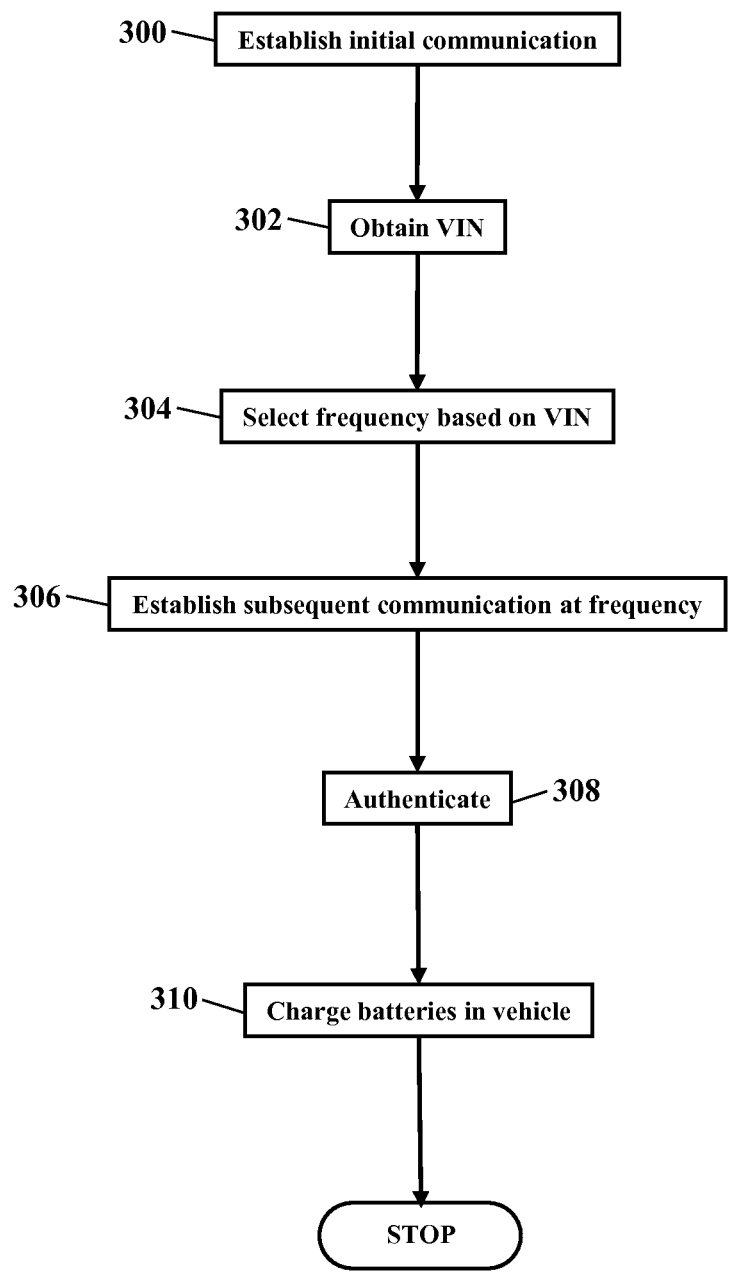
FIG. 27 is a flowchart illustrating a method of authentication, according to exemplary embodiments.

FIG. 27 is a flowchart illustrating a method of authentication, according to exemplary embodiments. The initial communication 30 is established (Block 300). The vehicle identification number ("VIN") 180 is obtained (Block 302). The frequency 44 is selected based on the vehicle identification number 180 (Block 304). The subsequent communication 42 is then established at the frequency 44 (Block 306) to authenticate the vehicle 10 (or an occupant) (Block 308). The batteries 20 are charged (Block 310).

Figure 28:
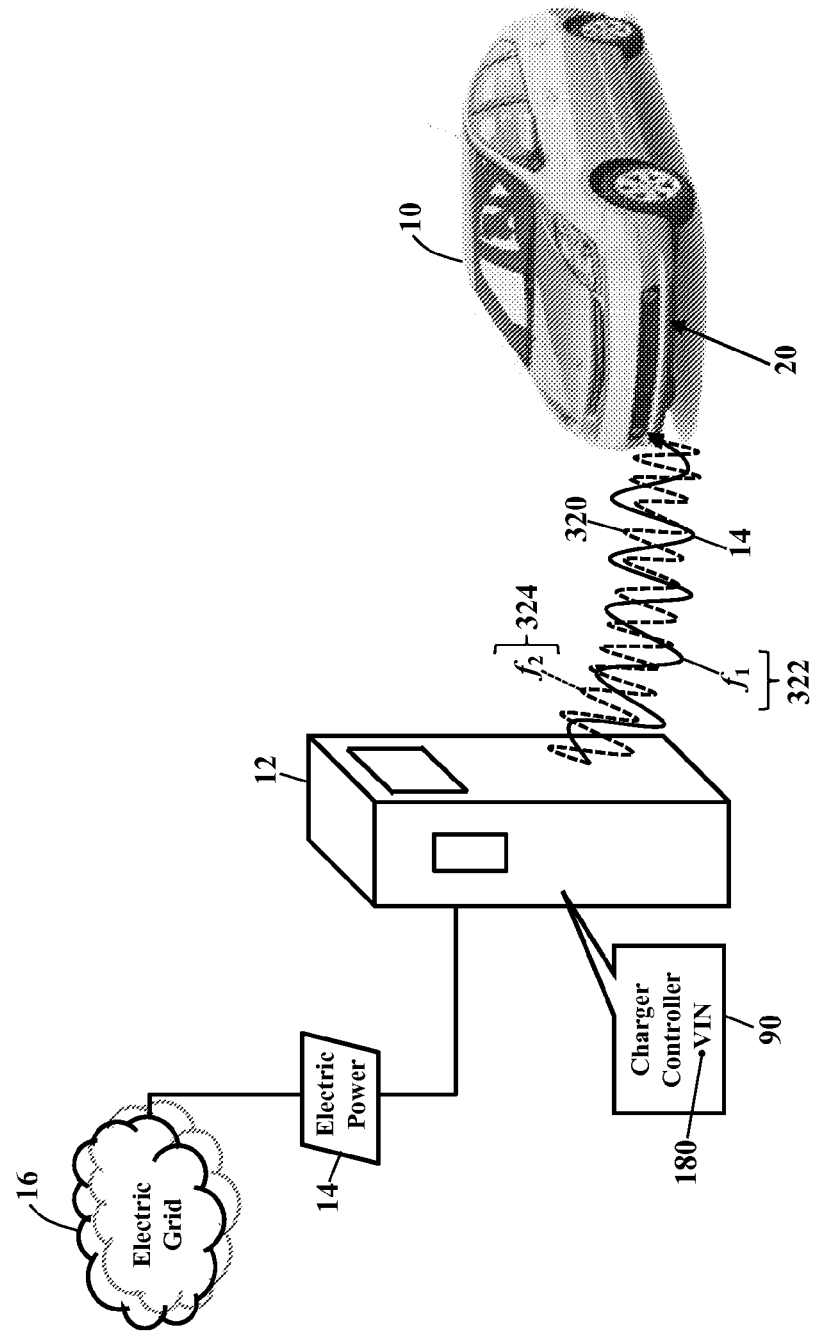
FIGS. 28-29 are diagrams illustrating superimposition, according to exemplary embodiments.
Figure 29:
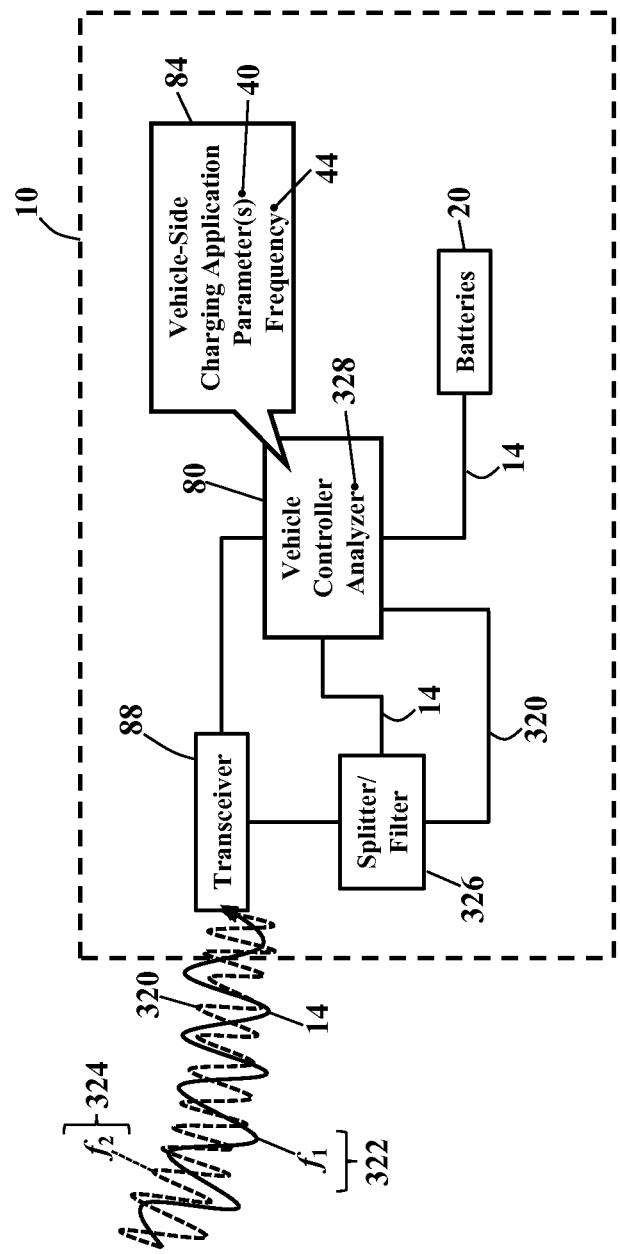

FIGS. 28-29 are diagrams illustrating superimposition, according to exemplary embodiments. Here exemplary embodiments may superimpose signals to authenticate charging of the batteries 20 in the vehicle 10. As earlier paragraphs explained, the charging station 12 wirelessly or wiredly sends the electrical power 14 to the vehicle 10 to charge the batteries 20. The electrical power 14 has the first frequency ("$f_1$") 44. While the first frequency 44 may be any frequency, the first frequency 44 may be the common 50 or 60 Hertz as is delivered by the electrical grid 16. Here, though, the charging station 12 superimposes a second signal 320 onto the electrical power 14. That is, the electrical power 14 may be considered as a first signal 322, and the second signal 320 is superimposed onto the electrical power 14. The second signal 320, however, may have a different, second frequency ("$f_2$") (illustrated as reference numeral 324) that is unequal to the frequency 44 of the electrical power 14.

As FIG. 29 illustrates, the second signal 320 may be separated from the electrical power 14. The second signal 320, for example, may be split or filtered (perhaps by a splitter/filter 326) from the electrical power 14. The second signal 320 may be sent to an analyzer circuit 328 that inspects the second signal 320. The second signal 320 may be inspected, decoded, or analyzed to authenticate the charging of the batteries 20. The second signal 320, for example, may be analyzed for the parameters 40 (perhaps established during the initial communication 30). For example, if the second signal 320 has the expected frequency 44 needed for authentication, then the vehicle controller 80 may charge the batteries 20. If the superimposed second signal 320 has the wrong frequency, charging may be denied.

The superimposed second signal 320 may be based on the vehicle identification number 180. As earlier paragraphs explained, the charging station 12 may obtain the vehicle identification number 180 that uniquely identifies the vehicle 10. The charger controller 90 may then query the parameter database 190 for the parameters 40 associated with the vehicle identification number 180. The parameter database 190 again associates the vehicle identification number 180 to the parameters 40. Here, though, the charger controller 90 retrieves the second frequency 324 required of the superimposed second signal 320. That is, the parameter database 190 associates the vehicle identification number 180 to the second frequency 324 of the superimposed second signal 320. The charger controller 90 then generates the second signal 320 and superimposes the second signal 320 onto the electrical power 14. The superimposed second signal 320 may be delivered along the charging cord 54, or wirelessly inducted, as earlier paragraphs explained. The second signal 320 is separated or filtered from the electrical power 14 and analyzed for authentication. If the analyzer circuit 328 verifies the second signal 320, the vehicle controller 80 may charge the batteries 20. If the superimposed second signal 320 has the wrong frequency, charging may be denied.

The superimposed second signal 320 may be authenticated for any value or content. As earlier paragraphs explained, the superimposed second signal 320 may be generated to have any current, voltage, or frequency. The superimposed second signal 320 may be generated to have any content or data, such as codes, images, or patterns. However the parameters 40 may be expressed, superimposed second signal 320 may be measured or analyzed for the parameters 40. If authentication is verified, the batteries 20 may be charged. If authentication fails, charging may be terminated.

Figure 30:
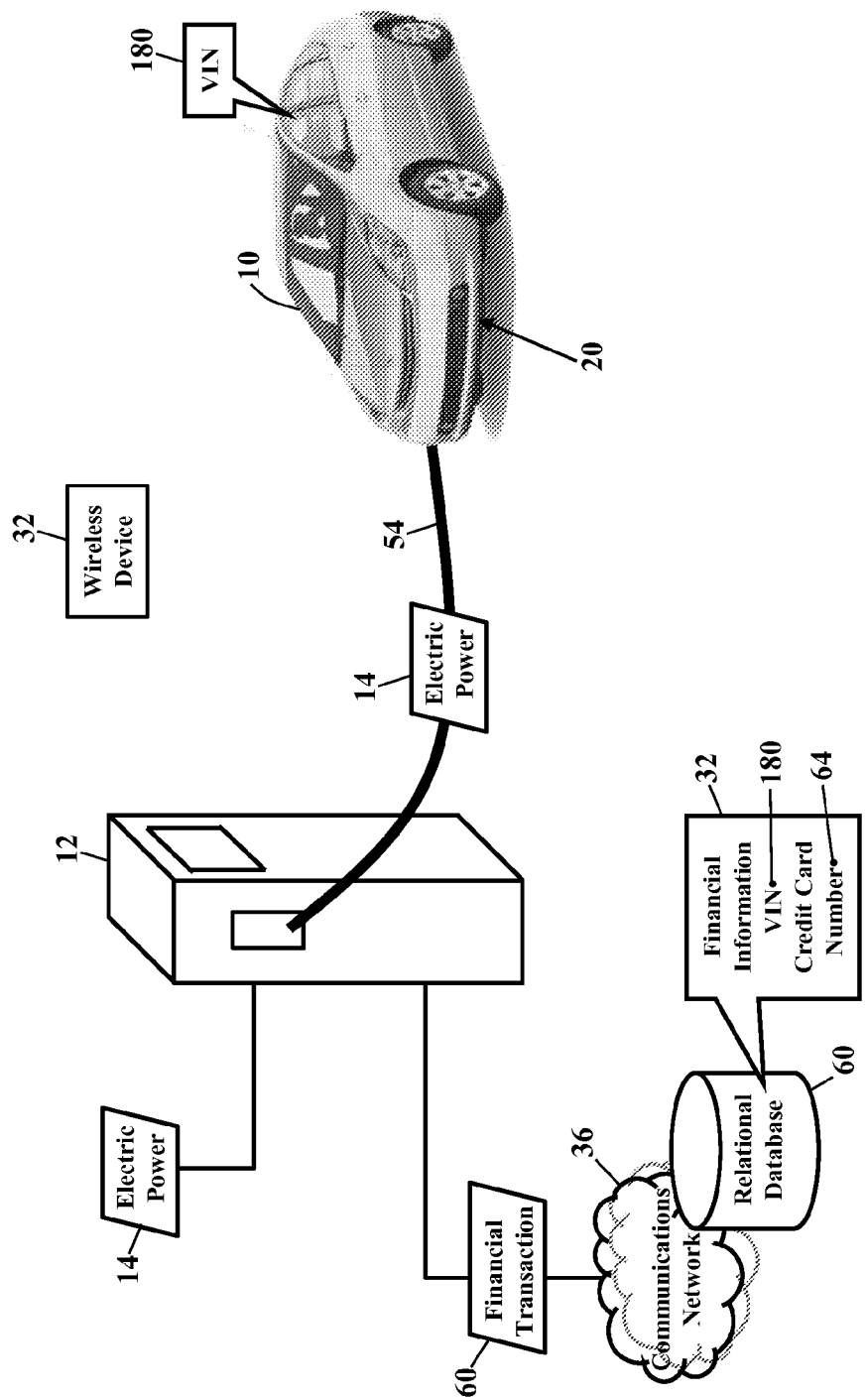
FIG. 30 is a diagram illustrating payment, according to exemplary embodiments.

FIG. 30 is another diagram illustrating payment, according to exemplary embodiments. Once the electrical power 14 is delivered to the vehicle 10 to charge the batteries 20, payment is arranged. Exemplary embodiments retrieve the financial information 32 to process the electronic financial transaction 60. Exemplary embodiments, for example, retrieve the credit card number 64 to charge for the electrical power 14 consumed by the batteries 20. The charging station 12 may retrieve the credit card number 64 associated with the user of the wireless device 32. The user may thus enter or swipe the credit card number 64 at the charging station 12. The charger controller 90, however, may also query for the credit card number 64 associated with the vehicle identification number 180. The parameter database 60, for example, may store entries that relate the vehicle identification number 180 to the credit card number 64. Regardless, the charging station 12 may bill the credit card number 64 for the electrical power 14. The financial information 32 may alternatively be any account or payment information that is processed. Metering and billing is further described in U.S. application Ser. No. 13/425,242, filed Mar. 20, 2012, and incorporated herein by reference in its entirety.

Figure 31:
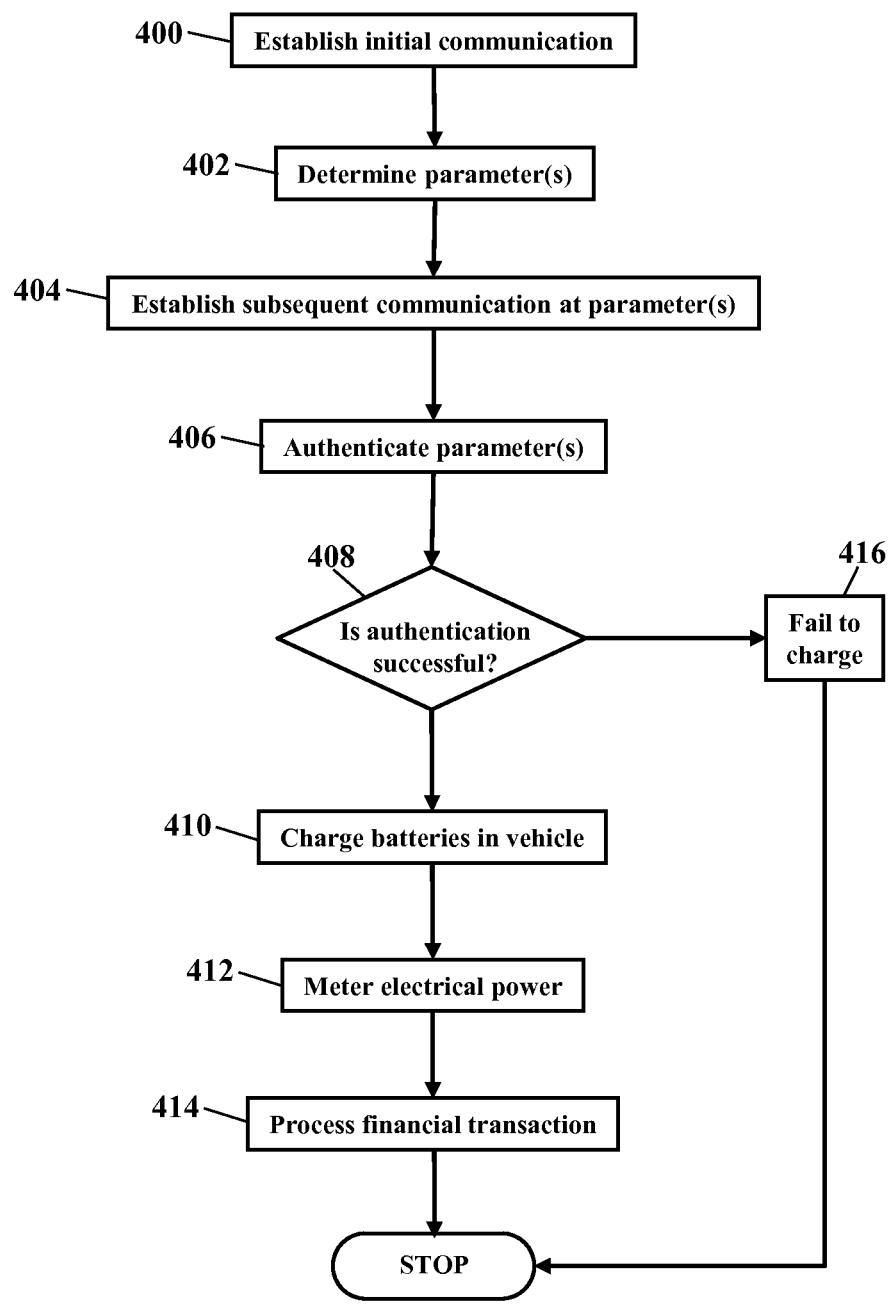
FIG. 31 is a flowchart illustrating an algorithm for charging the batteries, according to exemplary embodiments.

FIG. 31 is a flowchart illustrating an algorithm for charging the batteries 20, according to exemplary embodiments. Any portion of this algorithm may be executed by any of the clients 120 illustrated in FIG. 10. The initial communication is established (Block 400) and the parameters 40 are determined (Block 402). The subsequent communication is then established at the parameters 40 (Block 404). The parameters 40 of the subsequent communication 42 are authenticated (Block 406). If authentication is successful (Block 408), charging of the batteries 20 is authorized (Block 410) and the electrical power 14 is metered (Block 412). The financial transaction 60 is then processed as payment (Block 414). If, however, authentication is unsuccessful (Block 408), then charging may fail (Block 416).

Figure 32:
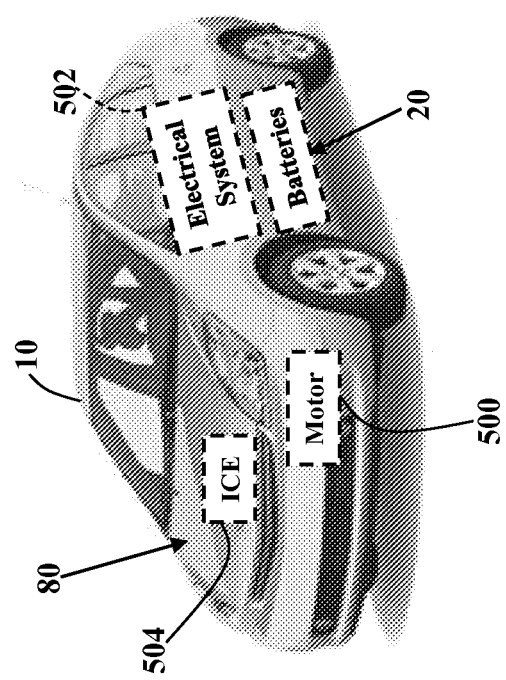
FIG. 32 is a detailed block diagram illustrating a vehicle, according to exemplary embodiments.

FIG. 32 is a more detailed block diagram illustrating the vehicle 10, according to exemplary embodiments. The one or more batteries 20 installed within the vehicle 10 provide electrical power to one or more electrical motors 500 and/or to the vehicle's electrical system 502. The electrical motors 500 may be used to mechanically drive the vehicle 10, perhaps using a transmission, planetary gear, or other electromechanical mechanism. The electrical system 502 distributes electrical power throughout the vehicle 10, as is known. The vehicle controller 80 may manage and/or control the electrical motors 500 and/or the electrical system 502. The vehicle 10 may even include an internal combustion engine ("ICE") 504. The components of the vehicle 10 are generally well-known and, thus, need not be further discussed.

Figure 33:
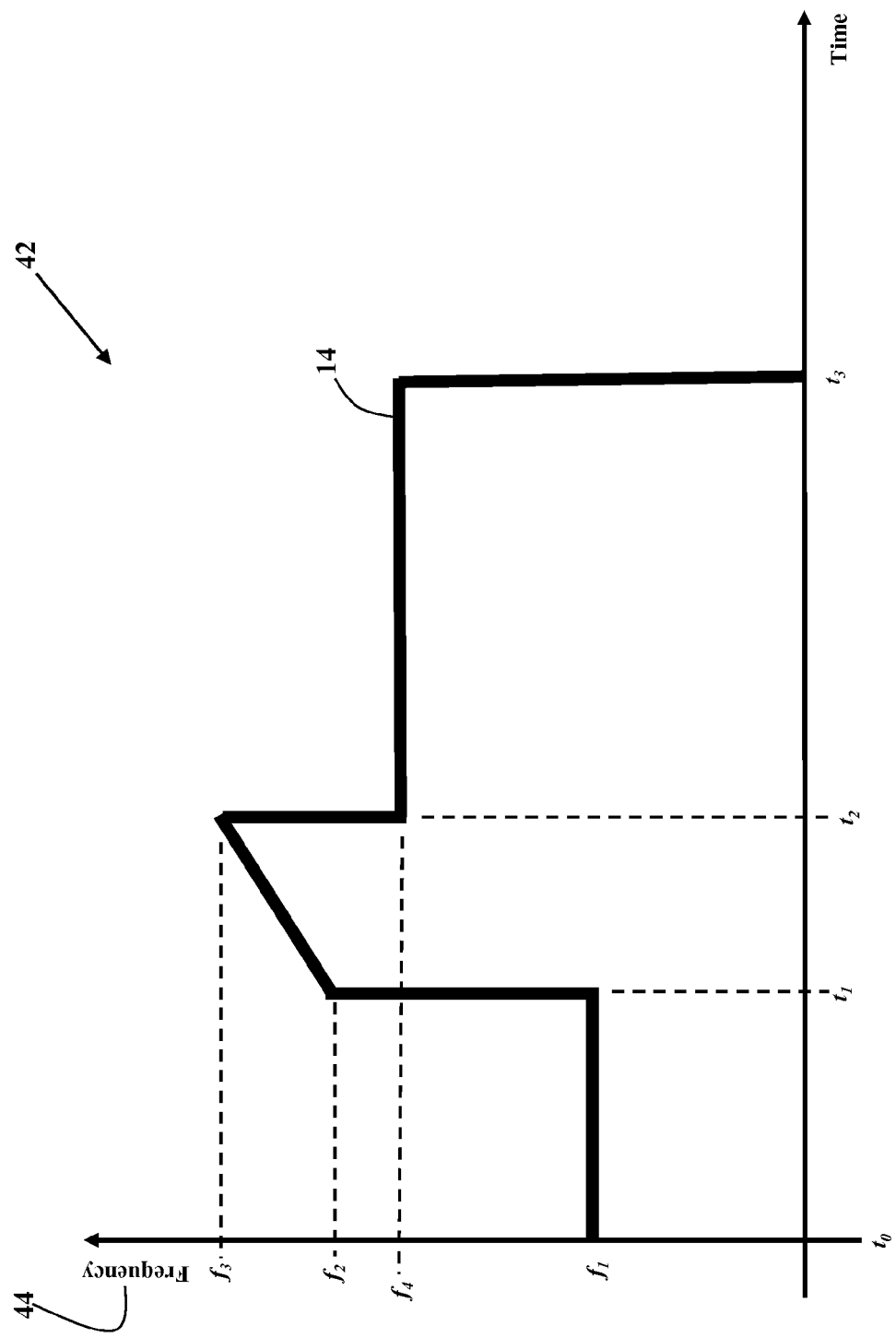
FIG. 33 is a graph further illustrating frequency variation, according to exemplary embodiments.

FIG. 33 is a graph further illustrating the frequency variation 150, according to exemplary embodiments. Here the subsequent communication 42 may exhibit multiple frequencies while charging the batteries in the vehicle. As FIG. 33 illustrates, the frequency 44 of charge may change or fluctuate as the electrical power 14 is delivered to the batteries 20. At time $t_0$, for example, the frequency 44 of the electrical power 14 may initially begin at a first frequency $f_1$. Later, at time $t_1$, the frequency 44 may change to a second frequency $f_2$. Between time $t_1$ and time $t_2$, the frequency may ramp increase from the second frequency $f_2$ to a third frequency $f_3$. That is, the frequency may constantly increase according to a steady or fixed rate to the third frequency $f_3$. A time $t_4$ the frequency may drop to a final value $f_4$ until the batteries 20 are fully charged. The different frequencies may be established during or from the initial communication 30, as earlier paragraphs explained.

Figure 34:
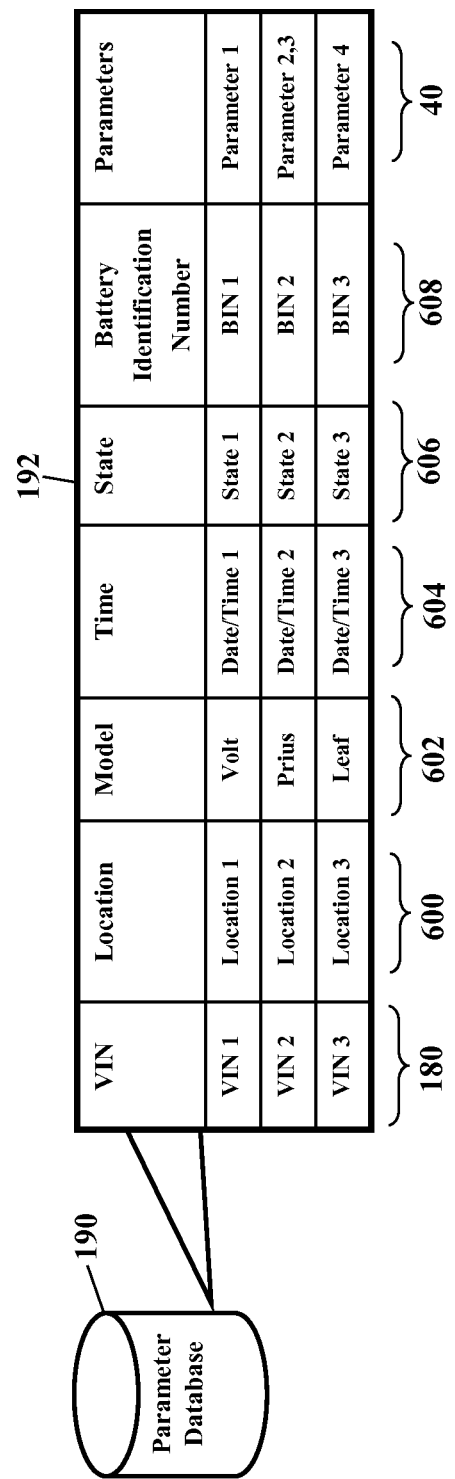
FIG. 34 is another detailed schematic illustrating a parameter database, according to exemplary embodiments.

FIG. 34 is another detailed schematic illustrating the parameter database 190, according to exemplary embodiments. The parameter database 190 stores relational values that define or determine the one or more parameters 40 for charging the batteries 20 in the vehicle 10. Once any data quantity is obtained regarding the vehicle 10, the parameter database 190 may be queried for the parameters 40 for charging the batteries 20. As earlier paragraphs explained, for example, if the vehicle identification number 190 is obtained, then the parameter database 190 may related or associated the vehicle identification number 190 to the charging parameters 40.

Other relationships, though, may be defined. Location 600, for example, may be used to determine the charging parameters 40. The location 600 of the vehicle 10, for example, may determine the current, voltage, or frequency of the electrical power 14 delivered to the batteries 20. The location 600 of the charging station 12 may be associated to the parameters 44. The location 600 may be defined using cell tower identification, GPS coordinates, or a street address of the charging station 12. Regardless, exemplary embodiments may obtain the location 600 and query the parameter database 190 for the corresponding charging parameters 40.

Brand model 602 may also determine the charging parameters 40. The Chevrolet Volt, the Toyota Prius, and the Nissan Leaf are currently available models that may require battery charging. Each manufacturer may establish the different charging parameters 40 for their various models 602. As the number of models 602 increases, different parameters 40 may be established for each model 602. The model 602, for example, may be discovered or obtained during the initial communication 30. Once known, exemplary embodiments may query the parameter database 190 for the corresponding charging parameters 40.

The parameters 40 may also be defined according to date and time 604. Different charging parameters 40 may be established for different dates and/or times of day. The charging station 12, for example, may receive a current time and query the parameter database 190 for the corresponding parameters 40. Higher current and/or voltage, for example, may be defined during hours when load on the electrical grid is reduced (e.g., night time hours and winter months).

The parameters 40 may also be defined according to state 606. Each state government, for example, may define their own charging parameters 40. The charging parameters 40 may alternatively or additionally be chosen based on the state 606 in which the vehicle was sold, is registered, or in which the owner/driver resides.

The parameters 40 may also be defined according to a battery identification number 608. The battery identification number (or "BIN") 608 is any alphanumeric combination that uniquely identifies the one or more batteries 20 installed in the vehicle 10. As the vehicle 10 ages with time and use, a time may come when the batteries 20 need replacement. As those of ordinary skill in the art understand, the service life of the batteries 20 may depend on many factors, including charging cycles, temperature, and electrical load. Indeed, the batteries may need replacement as soon as 50,000 miles, long before the serviceable life of the vehicle 10. In such cases the batteries 20 may need replacement, wherein new batteries are installed. The battery identification number 26 may thus be useful in tracking battery "swapping" procedures. Exemplary embodiments may obtain the battery identification number 608, perhaps during the initial communication 30. Once the battery identification number 608 is known, exemplary embodiments may query the parameter database 190 for the corresponding charging parameters 40. The battery identification number 608 is more fully described in U.S. application Ser. No. 13/425,242, filed Mar. 20, 2012, and incorporated herein by reference in its entirety.

Exemplary embodiments may be physically embodied on or in a computer-readable storage medium. This computer-readable medium may include CD-ROM, DVD, tape, cassette, floppy disk, memory card, USB, and large-capacity disks. This computer-readable medium, or media, could be distributed to end-subscribers, licensees, and assignees. A computer program product comprises processor-executable instructions for charging batteries, as the above paragraphs explained.

While the exemplary embodiments have been described with respect to various features, aspects, and embodiments, those skilled and unskilled in the art will recognize the exemplary embodiments are not so limited. Other variations, modifications, and alternative embodiments may be made without departing from the spirit and scope of the exemplary embodiments.

What is claimed is:

1. A method, comprising:
establishing an initial communication with a charging station;
retrieving from memory a vehicle identification number associated with a vehicle;
sending, during the initial communication, the vehicle identification number and an authentication credential to the charging station;
establishing, during the initial communication, an expected frequency of a subsequent communication based on the vehicle identification number;
terminating the initial communication with the charging station;
establishing the subsequent communication between the charging station and the vehicle;
comparing a transmission frequency of the subsequent communication to the expected frequency established during the initial communication;
determining the transmission frequency matches the expected frequency; and
charging a battery in the vehicle in response to the transmission frequency matching the expected frequency.

2. The method according to claim 1, further comprising metering electrical power consumed during charging the battery.

3. The method according to claim 2, further comprising querying for payment of the electrical power.

4. The method according to claim 1, further comprising retrieving financial information associated with the vehicle identification number.

5. The method according to claim 4, wherein retrieving the financial information comprises retrieving a credit card number.

6. The method according to claim 1, further comprising conducting an electronic financial transaction as the payment for charging the battery.

7. A system, comprising:
a processor; and
memory for storing code that when executed causes the processor to perform operations, the operations comprising:
receiving electrical power from a charging station at a first frequency;
receiving a signal at a second frequency superimposed onto the electrical power;
authenticating the signal;
determining an authentication of the signal is successful; and
charging a battery in a vehicle with the electrical power in response to determining the authentication is successful.

8. The system according to claim 7, wherein the operations further comprise retrieving a vehicle identification number that uniquely identifies the vehicle.

9. The system according to claim 8, wherein the operations further comprise selecting the second frequency of the signal based on the vehicle identification number.

10. The system according to claim 8, wherein the operations further comprise retrieving financial information associated with the vehicle identification number.

11. The system according to claim 8, wherein the operations further comprise retrieving a credit card number associated with the vehicle identification number.

12. The system according to claim 7, wherein the operations further comprise filtering the signal from the electrical power.

13. The system according to claim 7, wherein the operations further comprise metering the electrical power consumed during charging the battery.

14. The system according to claim 7, wherein the operations further comprise querying for payment for the electrical power.

15. The system according to claim 7, wherein the operations further comprise conducting an electronic financial transaction as payment for charging the battery.

16. A memory storing instructions that when executed cause a processor to perform operations, the operations comprising:

- establishing communication between a vehicle and a charging station;
- retrieving a vehicle identification number associated with the vehicle;
- selecting a frequency based on the vehicle identification number;
- receiving electrical power from an electrical grid;
- transforming the electrical power to the frequency based on the vehicle identification number; and
- sending transformed electrical power from the charging station to charge a battery in the vehicle.

17. The memory according to claim 16, further comprising instructions for authenticating the vehicle identification number.

18. The memory according to claim 16, further comprising instructions for metering the electrical power consumed during charging the battery.

19. The memory according to claim 16, further comprising instructions for metering the transformed electrical power consumed during charging the battery.

20. The memory according to claim 16, further comprising instructions for querying for payment of the electrical power.

* * * * *